(12) United States Patent
Li et al.

(10) Patent No.: US 11,038,749 B2
(45) Date of Patent: Jun. 15, 2021

(54) MEMORY RESOURCE ALLOCATION IN AN END-POINT DEVICE

(71) Applicant: INTEL CORPORATION, Santa Clara, CA (US)

(72) Inventors: Ang Li, Coquitlam (CA); Eng Hun Ooi, Georgetown (MY); Kuan Hua Tan, Coquitlam (CA)

(73) Assignee: Intel Corporation, Santa Clara, CA (US)

( * ) Notice: Subject to any disclaimer, the term of this patent is extended or adjusted under 35 U.S.C. 154(b) by 225 days.

(21) Appl. No.: 16/231,807

(22) Filed: Dec. 24, 2018

(65) Prior Publication Data
US 2019/0132198 A1 May 2, 2019

(51) Int. Cl.
| | |
|---|---|
| *G06F 15/177* | (2006.01) |
| *H04L 12/24* | (2006.01) |
| *G06F 12/02* | (2006.01) |
| *G06F 9/30* | (2018.01) |
| *G06F 9/50* | (2006.01) |
| *H04L 29/06* | (2006.01) |

(52) U.S. Cl.
CPC ........ *H04L 41/0803* (2013.01); *G06F 9/3013* (2013.01); *G06F 9/30134* (2013.01); *G06F 9/5016* (2013.01); *G06F 12/023* (2013.01); *H04L 63/0428* (2013.01)

(58) Field of Classification Search
CPC ............ H04L 41/0803; H04L 63/0428; G06F 9/3013; G06F 9/30134; G06F 9/5016; G06F 12/023
See application file for complete search history.

(56) References Cited

U.S. PATENT DOCUMENTS

| | | | | |
|---|---|---|---|---|
| 6,230,200 | B1* | 5/2001 | Forecast | .............. G06F 9/50 709/219 |
| 7,113,985 | B2* | 9/2006 | Narad | .............. G06F 9/5016 709/212 |
| 8,560,805 | B1* | 10/2013 | Yakovlev | ............ G06F 12/0223 711/202 |
| 9,526,063 | B2* | 12/2016 | Baker | ................. H04L 47/826 |
| 2003/0093604 | A1* | 5/2003 | Lee | ..................... G06F 11/0745 710/302 |

(Continued)

OTHER PUBLICATIONS

Intel Corporation, "PCI and PCI Express Configuration Space Registers", [online], [Retrieved on Nov. 30, 2018], Retrieved from the Internet at <URL: https://www.intel.com/content/www/us/en/programmable/documentation/lbl1414013788823/nik1410564908426/nik1410905624786.html>, 4 pp.

(Continued)

*Primary Examiner* — Razu A Miah
(74) *Attorney, Agent, or Firm* — Compass IP Law PC

(57) ABSTRACT

A handshake communication mechanism between a host and an end-point device permits multiple Base Address Registers (BAR registers) to be configured to size or resize the mapped address spaces associated with each BAR register. In one embodiment, the handshake communication mechanism includes a single address space reconfiguration request which may be transmitted in a single transaction layer packet, to request the configuration of multiple BAR registers of an end-point device. Other features and advantages may be realized, depending upon the particular application.

21 Claims, 9 Drawing Sheets

(56) References Cited

U.S. PATENT DOCUMENTS

| | | | | |
|---|---|---|---|---|
| 2004/0186986 A1* | 9/2004 | Huang | | G06F 9/4411 |
| | | | | 713/1 |
| 2004/0210663 A1* | 10/2004 | Phillips | | H04L 67/1014 |
| | | | | 709/230 |
| 2005/0041658 A1* | 2/2005 | Mayhew | | H04L 41/0803 |
| | | | | 370/389 |
| 2005/0066108 A1* | 3/2005 | Zimmer | | G06F 12/0223 |
| | | | | 711/1 |
| 2006/0143350 A1* | 6/2006 | Miloushev | | G06F 9/5016 |
| | | | | 710/242 |
| 2007/0186014 A1* | 8/2007 | Zimmer | | G06F 12/0223 |
| | | | | 710/10 |
| 2008/0040526 A1* | 2/2008 | Suzuki | | G06F 13/4081 |
| | | | | 710/302 |
| 2009/0077297 A1* | 3/2009 | Zhao | | G06F 9/5011 |
| | | | | 710/314 |
| 2010/0205350 A1* | 8/2010 | Bryant-Rich | | G06F 12/06 |
| | | | | 711/103 |
| 2012/0005445 A1* | 1/2012 | Escandell | | G06F 12/023 |
| | | | | 711/170 |
| 2014/0237156 A1* | 8/2014 | Regula | | G06F 13/4027 |
| | | | | 710/314 |
| 2014/0359044 A1* | 12/2014 | Davis | | H04L 49/15 |
| | | | | 709/213 |
| 2015/0178241 A1* | 6/2015 | Ajanovic | | G06F 13/385 |
| | | | | 710/29 |
| 2015/0206277 A1* | 7/2015 | Rao | | G06F 12/109 |
| | | | | 345/520 |
| 2015/0220409 A1* | 8/2015 | Shao | | G06F 11/0793 |
| | | | | 714/4.5 |
| 2015/0356049 A1* | 12/2015 | Bacha | | G06F 1/3296 |
| | | | | 710/110 |
| 2015/0379427 A1* | 12/2015 | Dirac | | G06N 20/00 |
| | | | | 706/12 |
| 2016/0173325 A1* | 6/2016 | Woodward | | H04L 41/0663 |
| | | | | 370/225 |
| 2016/0323237 A1* | 11/2016 | Warfield | | G06F 16/134 |

OTHER PUBLICATIONS

PCI Express, "PCI Express Base Specification", Revision 4.0 Version 1.0, Sep. 27, 2017, 1293 pp.

PCI-SIG, "Designated Vendor-Specific Extended Capability", PCI-SIG Engineering Change Notice, Workgroup Approval Aug. 13, 2015, 9 pp.

Wikipedia, "PCI Configuration Space", [online], last edited Oct. 11, 2018, [Retrieved on Nov. 30, 2018], Retrieved from the Internet at <URL: https://en.wikipedia.org/wiki/PCI_Configuration_Space>, 5 pp.

Wikipedia, "PCI Express", [online], last edited Nov. 10, 2018, [Retrieved on Nov. 21, 2018], Retrieved from the Internet at <URL: https://en.wikipedia.org/wiki/PCI_Express>, 24 pp.

Wikipedia, "Root Complex", [online], last edited Apr. 25, 2018, [Retrieved on Nov. 21, 2018], Retrieved from the Internet at <URL: https://en.wikipedia.org/wiki/Root_Complex>, 1 pg.

Winkles, J., "PCI Express Basics", © 2006 PCI-SIG, 40 pp.

* cited by examiner

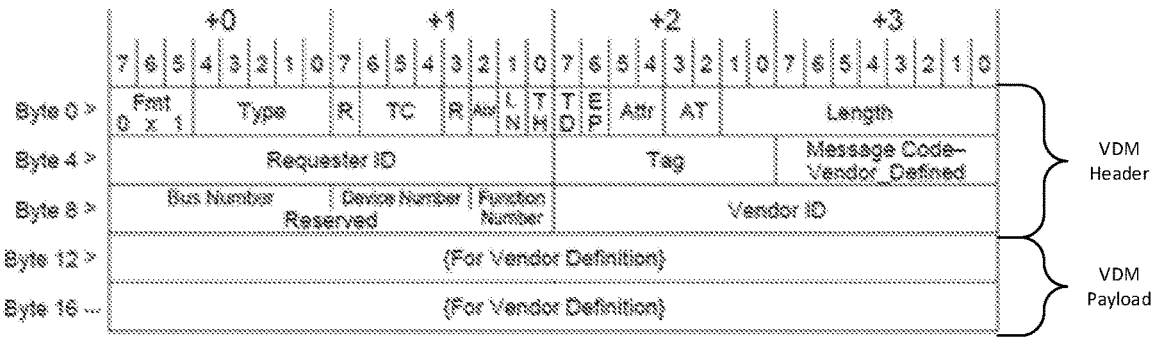

FIG. 5
PRIOR ART

| Bit Location | Register Description | Attributes |
|---|---|---|
| 15:0 | VSEC ID – This field is a vendor-defined ID number that indicates the nature and format of the VSEC structure.<br><br>Software must qualify the Vendor ID before interpreting this field. | RO |
| 19:16 | VSEC Rev – This field is a vendor-defined version number that indicates the version of the VSEC structure.<br><br>Software must qualify the Vendor ID and VSEC ID before interpreting this field. | RO |
| 31:20 | VSEC Length – This field indicates the number of bytes in the entire VSEC structure, including the PCI Express Extended Capability header, the Vendor-Specific header, and the Vendor-Specific registers. | RO |

FIG. 8
PRIOR ART

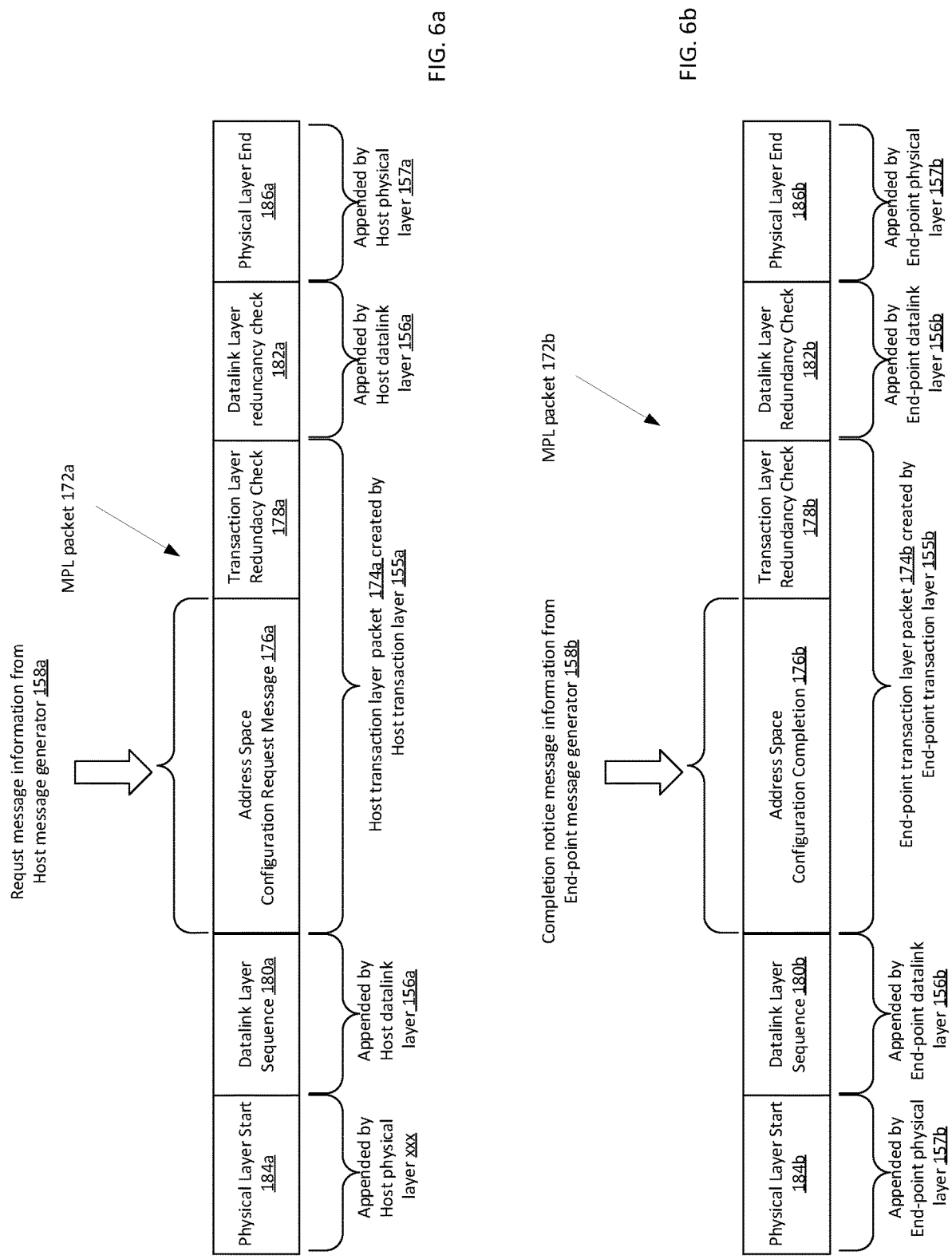

| | 31 | 24 | 23 | 16 | 15 | 8 | 7 | 0 |
|---|---|---|---|---|---|---|---|---|
| 0x000 | Device ID | | | | Vendor ID | | | |
| 0x004 | Status | | | | Command | | | |
| 0x008 | Class Code | | | | | | Revision ID | |
| 0x00C | 0x00 | | Header Type | | 0x00 | | Cache Line Size | |
| 0x010 | BAR Registers | | | | | | | |
| 0x014 | BAR Registers | | | | | | | |
| 0x018 | BAR Registers | | | | | | | |
| 0x01C | BAR Registers | | | | | | | |
| 0x020 | AR Registers | | | | | | | |
| 0x024 | BAR Registers | | | | | | | |
| 0x028 | Reserved | | | | | | | |
| 0x02C | Subsystem Device ID | | | | Subsystem Vendor ID | | | |
| 0x030 | Expansion ROM Base Address | | | | | | | |
| 0x034 | Reserved | | | | | | Capabilities Pointer | |
| 0x038 | Reserved | | | | | | | |
| 0x03C | 0x00 | | | | Interrupt Pin | | Interrupt Line | |
FIG. 7
PRIOR ART
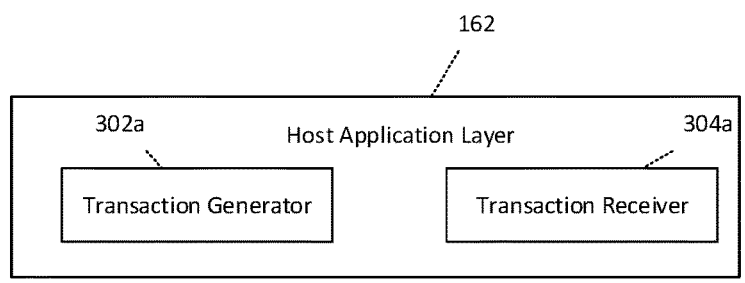
FIG. 9a
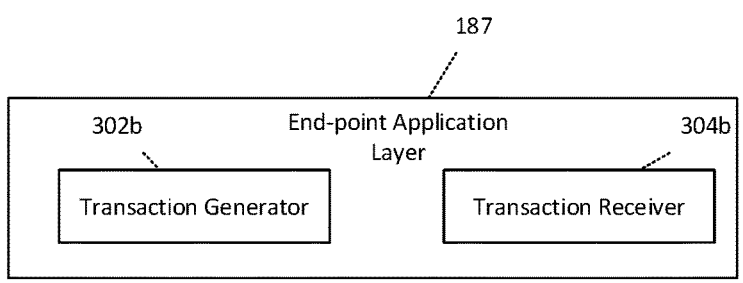
FIG. 9b

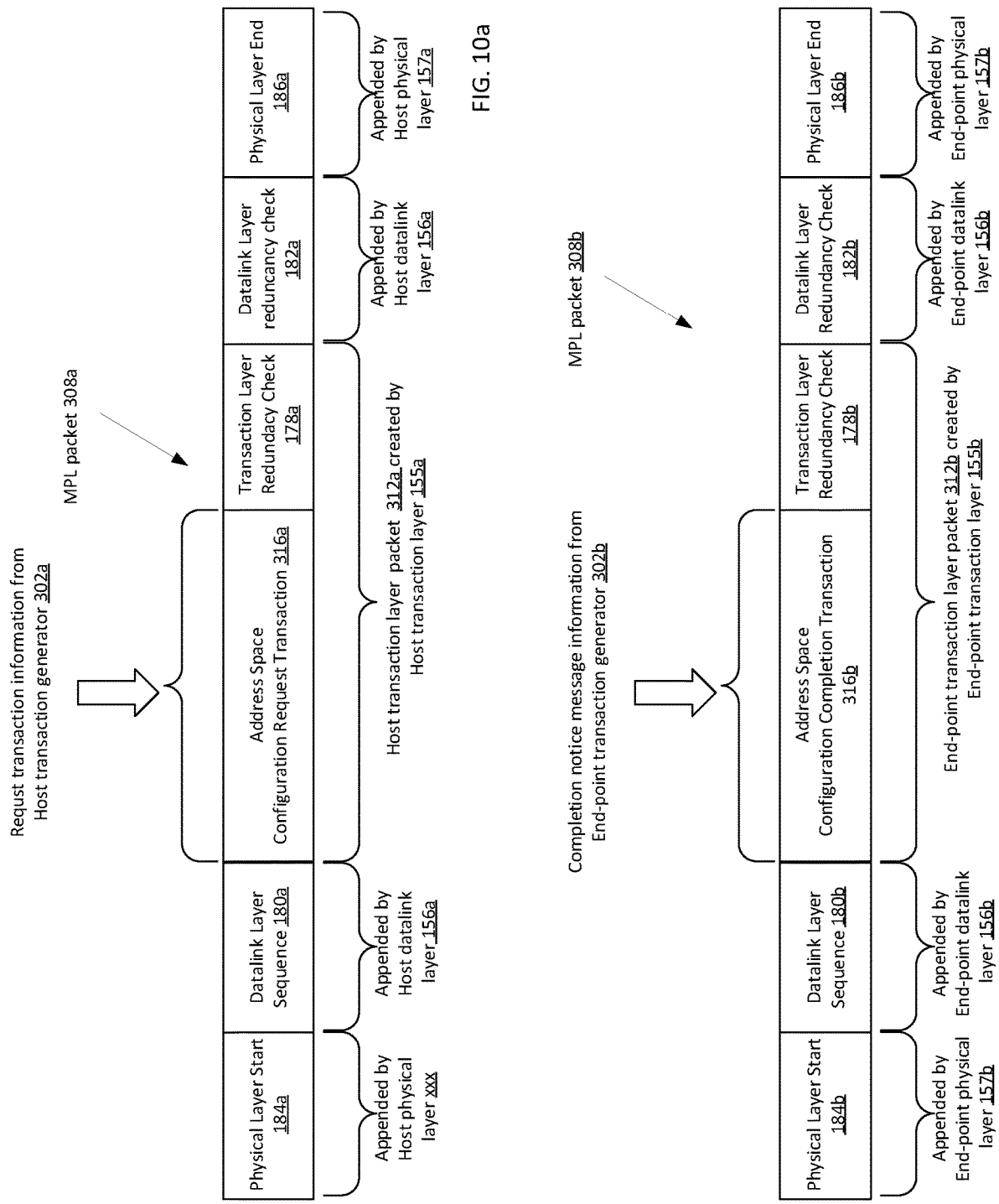

MEMORY RESOURCE ALLOCATION IN AN END-POINT DEVICE

BACKGROUND

A computer system may have a variety of peripheral devices such as a solid state drive (SSD) coupled to a host which typically includes a central processing unit (CPU) which may be a part of a system on a chip (SoC), for example. A solid state drive (SSD) is a data storage device that uses integrated circuit assemblies as memory to store data persistently. SSDs have no moving mechanical components and this distinguishes SSDs from traditional electromechanical magnetic disks, such as, hard disk drives (HDDs) or floppy disks, which contain spinning disks and movable read/write heads. Compared to electromechanical disks, SSDs are typically more resistant to physical shock, run silently, have lower access time, and have less latency. Many types of SSDs use NAND-based flash memory which comprises an electronic (solid-state) non-volatile computer storage medium that can be electrically erased and reprogrammed.

Peripheral devices such as an SSD are typically coupled to the host by a serial or parallel bus. One known serial bus standard is the Peripheral Component Interconnect Express (PCI Express) frequently abbreviated as PCIe or PCI-e. To address a PCIe device, the device is mapped into the host's Input/Output (I/O) port address space or mapped address space, or both. For example, a peripheral device may have its own address space which is mapped into the host address space typically through Base Address Registers (often called BAR registers) usually located on the peripheral devices. The host through its firmware, device drivers or operating system, may program the BAR registers by issuing configuration transactions to the peripheral device.

However at system startup or reset, the PCI devices are typically initially in an inactive state and do not have addresses assigned to them by which the host can communicate with them. Accordingly, at system startup or reset, the host through its Basic Input/Output System (BIOS), operating system (OS) or other startup logic, performs an enumeration process which systematically identifies the peripheral devices connected to the host and the function each performs. For example, the host may attempt to read a vendor identification (VID) and device identification (DID) register for each possible combination of bus number, and device number for a particular function number (B/D/F).

If a read operation to a specified B/D/F combination succeeds, the host has identified a peripheral device and may proceed to configure the BAR registers of the device to map the address spaces of the device. In one known configuration process, the host writes all ones to a BAR register of the device and reads back a requested address space size advertised by the identified device. Using the requested address space size, the host programs memory-mapped addresses into the BAR register of the device. Each BAR register is configured in this manner to describe a region of mapped address space which contains addresses by which the host may address the device and the device will respond.

Peripheral devices may have different modes of operation which require different sizes of mapped address space. For example, an SSD may have a basic storage mode of operation which utilizes a relatively small mapped address space, and may have a more enhanced mode such as a two-level memory mode of operation which may require a larger mapped address space. Because not all hosts may be capable of supporting enhanced modes of operation of a multi-mode device, multi-mode devices typically advertise a minimum requested address space during the enumeration process to avoid conflicts in the event the host does not support the more enhanced mode of operation. As a result, the host initially programs into the BAR registers of the device, the minimum size space of memory-mapped addresses.

However, should the host be capable of supporting an enhanced mode and an associated larger mapped address space of the device, the PCIe specification provides a process for resizing the mapped address space by reconfiguring the BAR registers of the device. In order to change the mapped address space size of one BAR in one function, the host takes the following actions:

Two CfgRd transactions, each to a "Resizable BAR Capability Register" and a "Resizable BAR Control Register" to determine resizable BAR Capability which typically resides in part in both registers.

CfgWr transaction to clear a "Memory Space Enable" register.

CfgWr transaction to program the new size via the BAR Size field of the Resizable BAR Control register.

Reprogram the BAR register using the standard BAR register programming procedure, which includes:
  CfgWr transaction to write all-ones to the BAR register.
  CfgRd transaction to read the BAR register and determine the BAR size based on read-back value. (This step is normally redundant since the host will already have known the size as indicated above but it is nonetheless a part of the standard BAR program.)
  CfgWr transaction to write transaction to the BAR based on system memory allocation decision.
  CfgWr transaction to "Set Memory Space Enable."

The above procedure is repeated for each BAR register which is to be reconfigured to provide a different size of mapped address space.

BRIEF DESCRIPTION OF THE DRAWINGS

Referring now to the drawings in which like reference numbers represent corresponding parts throughout:

FIG. 5 depicts a prior art Vendor Defined Message (VDM) header and payload.

FIG. 6a depicts an example of an address space configuration request message generated by a host employing memory resource allocation in an end-point device in accordance with the present description;

FIG. 6b depicts an example of an address space configuration completion notice generated by an end-point device employing memory resource allocation in an end-point device in accordance with the present description;

FIG. 7 depicts a prior art configuration of a data structure in an end-point device which includes Base Address Registers (BAR registers);

FIG. 8 depicts a prior art Vendor Specific Extended Capability (VSEC) data structure header.

FIG. 9a illustrates an example of a host application layer in a host employing memory resource allocation in an end-point device in accordance with the present description;

FIG. 9b illustrates an example of an end-point application layer in an end-point device employing memory resource allocation in accordance with the present description;

FIG. 10a depicts an example of an address space configuration request transaction generated by a host employing memory resource allocation in an end-point device in accordance with the present description;

FIG. 10b depicts an example of an address space configuration completion transaction generated by an end-point device employing memory resource allocation in an end-point device in accordance with the present description.

DETAILED DESCRIPTION

Figure 1:
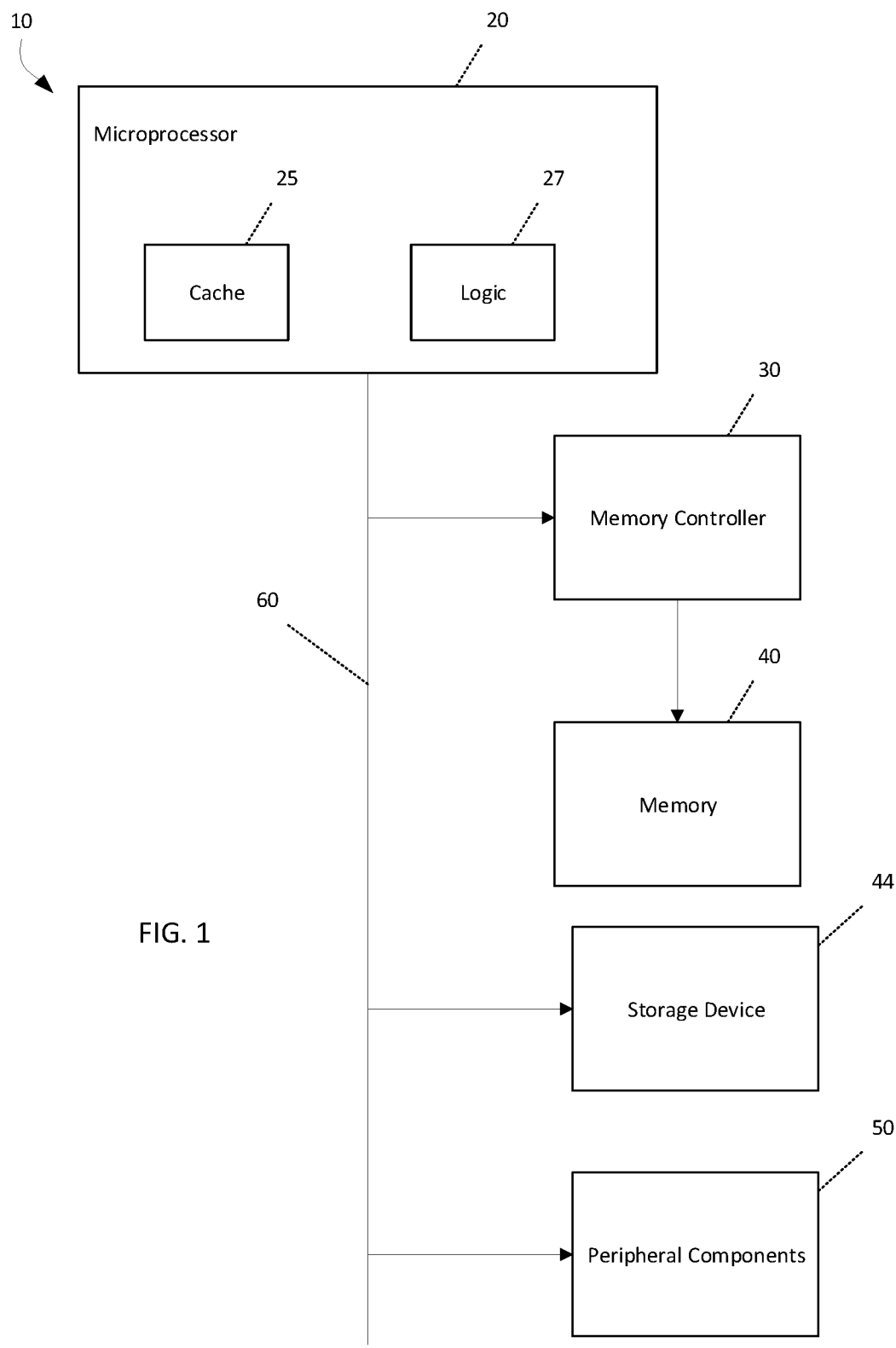
FIG. 1 illustrates a block diagram of a computing environment employing memory resource allocation in an end-point device in accordance with certain embodiments.

In the following description, reference is made to the accompanying drawings which form a part hereof and which illustrate several embodiments. It is understood that other embodiments may be utilized and structural and operational changes may be made.

Memory resource allocation in an end-point device in accordance with the present description is directed to improving the efficiency and speed of memory resource allocation which can improve system performance. In one embodiment, memory resource allocation in accordance with the present description includes a handshake mechanism between the host and an end-point device which can configure the mapped address spaces of multiple BAR registers of the end-point device with as few as a single configuration request from the host and a single configuration completion notice from the end-point device. In this manner, address space configuration in an end-point device may be completed quickly and efficiently. By improving the efficiency and speed of memory resource allocation, a significant improvement to computer technology is provided.

A multi-function end-point device such as a PCIe device may have enhanced or proprietary modes of operation which require different sizes of mapped address spaces defined by the BAR registers of the device. For example, a storage PCIe end-point device may have a basic storage-only mode requiring relatively small mapped address spaces, and an enhanced, two-level memory mode providing both memory and storage, which require different, usually larger mapped address spaces as compared to the basic storage mode.

However, not all hosts are capable of utilizing all the functions of a multi-function end-point device. Accordingly, at system start-up, the multi-function end-point device usually advertises to the host, requests for minimum sizes for the mapped address spaces to ensure compatibility with the host operating system and device drivers. The host then uses the advertised minimum sizes to initially set the BAR registers of the end-point device to have associated mapped address spaces, each mapped address space having a minimum size in accordance with the minimum sizes initially requested by the end-point device.

Should the host be capable of utilizing modes or functions of the end-point device which require different or larger mapped address spaces, the host can reconfigure the address spaces of the BAR registers so that each reconfigured BAR register is updated to have an associated mapped address space of an updated size. For example, a host capable of utilizing the memory-storage combination function of a PCIe storage device may switch modes from an initial storage-only mode to a memory-storage combination mode. However, to utilize the memory-storage combination mode, the host first reconfigures the BAR registers of the device to have the different, usually larger associated mapped address space sizes.

As set forth above, a known communication process between a host and a PCIe end-point device for reconfiguring BAR registers of the PCIe end-point device is lengthy and time-consuming, utilizing many configuration read and configuration write transactions to accomplish the updating of a single BAR register. This known communication process is repeated for each BAR register of the end-point device to be updated. As a result, known communication processes for reconfiguring BAR registers can provide significant challenges to the system BIOS and software drivers when switching from one mode to another mode of the end-point device. Still further, it is appreciated that the known communication process is exposed on the PCIe link and thus is susceptible to eavesdropping or other kinds of malicious attacks.

By comparison, memory resource allocation in an end-point device in accordance with one embodiment of the present description, provides a handshake mechanism between the host and an end-point device which can configure the mapped address spaces of some or all of the multiple BAR registers of the end-point device with as few as a single configuration request from the host and a single configuration completion notice from the end-point device. In this manner, address space configuration in an end-point device may be completed quickly and efficiently. Moreover, aspects of the handshake mechanism may be readily encrypted or otherwise hidden to reduce or eliminate vulnerability to malicious attacks.

Moreover, it is appreciated herein that a known PCIe communication process between a host and a PCIe end-point device for reconfiguring BAR registers of the PCIe end-point device, is not only lengthy and time-consuming, but is also limited to configuring BAR registers within the memory space managed by the operating system, for example. By comparison, a handshake mechanism employing memory resource allocation in an end-point device in accordance with one embodiment of the present description can configure the BAR registers of the end-point device to have mapped address spaces which are outside the memory region managed by the operating system.

For example, a CPU is capable of managing memory regions outside the memory region managed by the operating system. In accordance with the present description, the CPU can generate a memory space configuration request and transmit it to the end-point device to cause a memory region outside the memory region managed by the operating system to be allocated to the end point device. For example, a cache of the end-point device may be allocated a memory region managed by the CPU and outside the memory region managed by the operating system. As a result, the memory space available for allocation to the end-point device can be significantly larger than the memory space available for allocation to the end-point device if limited to the memory space managed by the operating system.

In one embodiment, the handshake mechanism includes a Vendor Defined Message (VDM) which is configured as a single configuration request message from the host. The single VDM configuration request message may be conveyed in a single transaction layer packet and contain all the information appropriate to configure as many as some or all of the BAR registers to have the appropriate sized mapped address spaces for the selected mode of operation of the end-point device.

In another embodiment, the handshake mechanism includes a single configuration write transaction conveyed as a single transaction layer packet configured as an address space configuration request from the host, which creates and populates a Vendor Specific Extended Capability (VSEC) data structure on the end-point device. Here too, a single VSEC data structure created and populated by a single VSEC configuration write transaction may contain all the information appropriate to configure some or all of the BAR registers of the device to have the appropriate sized mapped address spaces for the selected mode of operation of the end-point device. In each of these embodiments, BAR register configuration information may be hidden or encrypted to deter exposure of the information to malicious actors or other unauthorized parties.

It is appreciated that other communication formats including other types of messages, configuration write transactions and commands, may be utilized in memory resource allocation in accordance with the present description, depending upon the particular application. Although described in connection with a PCIe communication protocol, it is appreciated that memory resource allocation in accordance with the present description may be used in conjunction with other communication protocols, depending upon the particular application Moreover, it is appreciated that other features and advantages of employing memory resource allocation in accordance with the present description may be realized, depending upon the particular application. For example, logic implementing aspects of the memory resource allocation in accordance with the present description may be implemented primarily in an application layer of a system or end-point device, in one embodiment, facilitating deployment of memory resource allocation in accordance with the present description to a variety of systems.

Components employing memory resource allocation in accordance with the present description can be used either in stand-alone components, or can be embedded in microprocessors and/or digital signal processors (DSPs). Additionally, it is noted that although systems and processes are described herein primarily with reference to microprocessor based systems in the illustrative examples, it will be appreciated that in view of the disclosure herein, certain aspects, architectures, and principles of the disclosure are equally applicable to other types of device memory and logic devices.

Implementations of the described techniques may include hardware, a method or process, or computer software such an application, operating system, BIOS, or component driver on a computer-accessible medium. Thus, embodiments include corresponding computer systems, apparatus, and computer programs recorded on one or more computer storage devices, each configured to perform the actions of the methods.

Operations described herein are performed by logic which is configured to perform the operations either automatically or substantially automatically with little or no system operator intervention, except where indicated as being performed manually such as user selection. Thus, as used herein, the term "automatic" includes both fully automatic, that is operations performed by one or more hardware or software controlled machines with no human intervention such as user inputs to a graphical user selection interface. As used herein, the term "automatic" further includes predominantly automatic, that is, most of the operations (such as greater than 50%, for example) are performed by one or more hardware or software controlled machines with no human intervention such as user inputs to a graphical user selection interface, and the remainder of the operations (less than 50%, for example) are performed manually, that is, the manual operations are performed by one or more hardware or software controlled machines with human intervention such as user inputs to a graphical user selection interface to direct the performance of the operations.

Many of the functional elements described in this specification have been labeled as "logic," in order to more particularly emphasize their implementation independence. For example, a logic element may be implemented as a hardware circuit comprising custom Very Large Scale Integrated (VLSI) circuits or gate arrays, off-the-shelf semiconductors such as logic chips, transistors, or other discrete components. A logic element may also be implemented in firmware or programmable hardware devices such as field programmable gate arrays, programmable array logic, programmable logic devices or the like.

A logic element may also be implemented in software for execution by various types of processors. A logic element which includes executable code may, for instance, comprise one or more physical or logical blocks of computer instructions which may, for instance, be organized as an object, procedure, or function.

Nevertheless, the executables of an identified logic element need not be physically located together, but may comprise disparate instructions stored in different locations which, when joined logically together, comprise the logic element and achieve the stated purpose for the logic element.

Indeed, executable code for a logic element may be a single instruction, or many instructions, and may even be distributed over several different code segments, among different programs, among different processors, and across several non-volatile memory devices. Similarly, operational data may be identified and illustrated herein within logic elements, and may be embodied in any suitable form and organized within any suitable type of data structure. The operational data may be collected as a single data set, or may be distributed over different locations including over different storage devices.

Turning to the figures, FIG. 1 is a high-level block diagram illustrating selected aspects of a system implemented according to an embodiment of the present disclosure. System 10 may represent any of a number of electronic and/or computing devices, that may include an end-point device such as a memory device. Such electronic and/or computing devices may include computing devices such as a mainframe, server, personal computer, workstation, telephony device, network appliance, virtualization device, storage controller, portable or mobile devices (e.g., laptops, netbooks, tablet computers, personal digital assistant (PDAs), portable media players, portable gaming devices, digital cameras, mobile phones, smartphones, feature phones, etc.) or component (e.g. system on a chip, processor, bridge, memory controller, I/O controller, root complex, memory, etc.). In alternative embodiments, system 10 may include more elements, fewer elements, and/or different elements. Moreover, although system 10 may be depicted as comprising separate elements, it will be appreciated that such elements may be integrated on to one platform, such as systems on a chip (SoCs). In the illustrative example, system 10 comprises a central processing unit or microprocessor 20, a memory controller 30, a memory 40, a storage drive 44 and peripheral components 50 which may include, for example, end-point devices such as a video controller, additional storage, network interface, and other devices such as system clock, input device, output device, battery, etc. The system 10 also includes one or more busses 60 which may include serial busses, parallel busses, and a fabric which may include links and switches.

The microprocessor 20 includes a cache 25 that may be part of a memory hierarchy to store instructions and data, and the system memory may include both volatile memory as well as the memory 40 depicted which may include a non-volatile memory. The system memory may also be part of the memory hierarchy. Logic 27 of the microprocessor 20 may include a one or more cores, for example. In some embodiments, the logic 27 may also include a system clock. Communication between the microprocessor 20 and the memory 40 may be facilitated by the memory controller (or chipset) 30, which may also facilitate in communicating with the storage drive 44 and the peripheral components 50. The system may include an offload data transfer engine for direct memory data transfers.

Storage drive 44 may be an end-point device and includes non-volatile storage and may be implemented as, for example, solid-state drives, magnetic disk drives, optical disk drives, storage area network (SAN), network access server (NAS), a tape drive, flash memory, persistent memory domains and other storage devices employing a volatile buffer memory and a nonvolatile storage memory. The storage may comprise an internal storage device or an attached or network accessible storage. The microprocessor 20 is configured to write data in and read data from the memory 40 and storage 44. Programs in the storage are loaded into the memory 40 and executed by the microprocessor 20. A network controller or adapter enables communication with a network, such as an Ethernet, a Fiber Channel Arbitrated Loop, etc. Further, the architecture may, in certain embodiments, include a video controller configured to render information on a display monitor, where the video controller may be embodied on a video card or integrated on integrated circuit components mounted on a motherboard or other substrate. An input device is used to provide user input to the microprocessor 20, and may include a keyboard, mouse, pen-stylus, microphone, touch sensitive display screen, input pins, sockets, or any other activation or input mechanism known in the art. An output device is capable of rendering information transmitted from the microprocessor 20, or other component, such as a display monitor, printer, storage, output pins, sockets, etc. The network adapter may be embodied on a network card, such as a peripheral component interconnect (PCI) card, PCI-express, or some other input/output (I/O) card, or on integrated circuit components mounted on a motherboard or other substrate.

One or more of the components of the device 10 may be omitted, depending upon the particular application. For example, a network router may lack a video controller, for example. Any one or more of the devices of FIG. 1 including the cache 25, memory 40, storage drive 44, system 10, memory controller 30 and peripheral components 50, may include components implementing memory resource allocation in an end-point device in accordance with the present description.

One example of a nonvolatile storage memory of a nonvolatile storage memory component in accordance with the present description is a 3-dimensional (3D) crosspoint memory, and other types of byte-addressable, write-in-place non-volatile memory. In some embodiments, 3D crosspoint memory may comprise a transistor-less stackable cross point architecture in which memory cells sit at the intersection of word lines and bit lines and are individually addressable and in which bit storage is based on a change in bulk resistance.

In one embodiment, the memory device is a block addressable memory device, such as those based on NAND or NOR technologies. A memory device may also include future generation nonvolatile devices, such as a three dimensional crosspoint memory device, or other byte addressable write-in-place nonvolatile memory devices. In one embodiment, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device may refer to the die itself and/or to a packaged memory product.

Volatile memory may be a storage medium that requires power to maintain the state of data stored by the medium. Non-limiting examples of volatile memory may include various types of random access memory (RAM), such as dynamic random access memory (DRAM) or static random access memory (SRAM). One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4 (these standards are available at www.jedec.org). Such standards (and similar standards) may be referred to as DDR-based standards and communication interfaces of the storage devices that implement such standards may be referred to as DDR-based interfaces.

Figure 2:
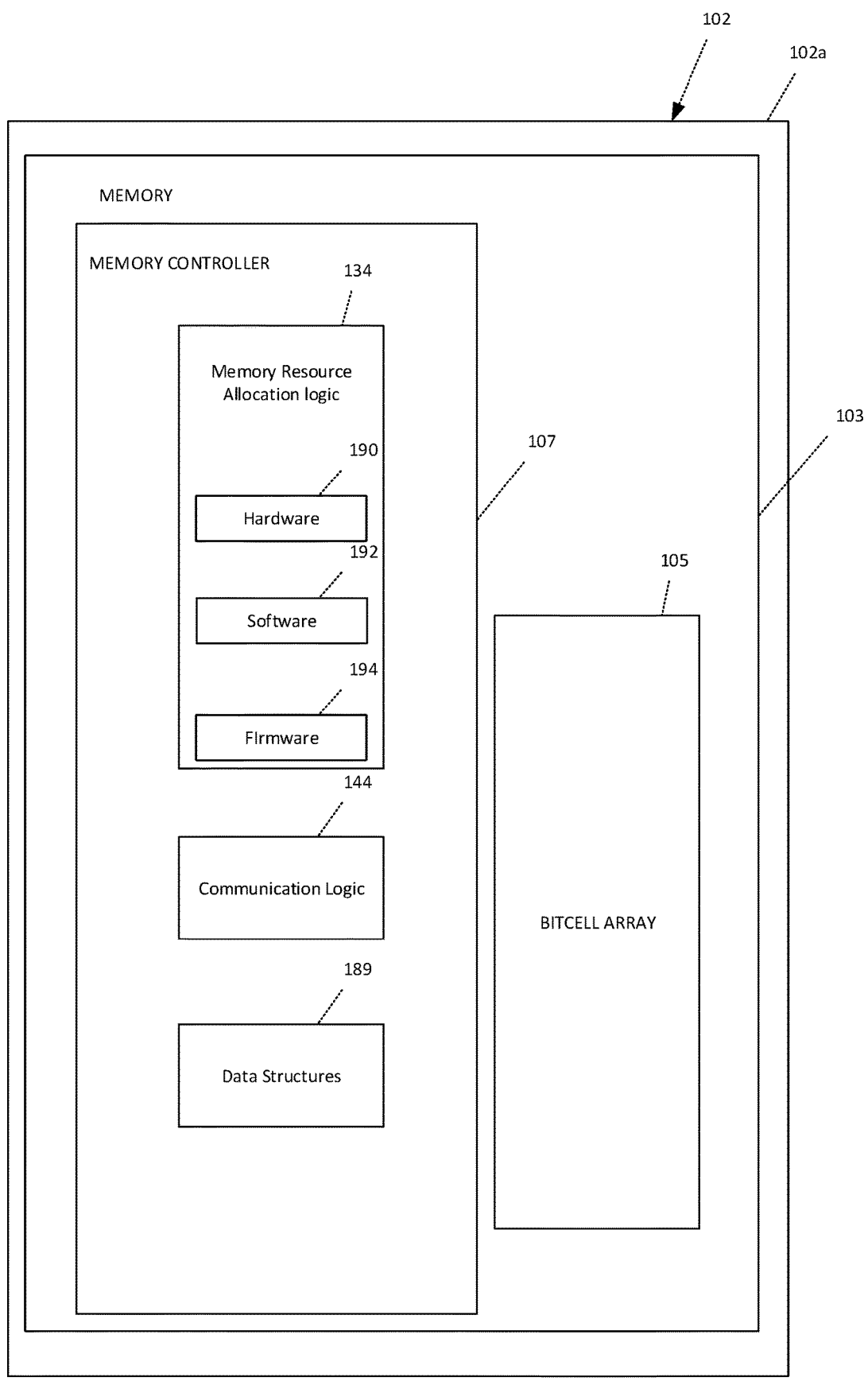
FIG. 2 illustrates an example of an end-point device employing memory resource allocation in accordance with the present description.

FIG. 2 shows one example of an end-point device 102 in accordance with the present description. In this example, the end-point device 102 is a nonvolatile storage memory component such as a solid state drive of the storage devices 44 (FIG. 1) of the system 10. It is appreciated that an end-point device employing memory resource allocation in accordance with the present description may be other types of end-point devices such as graphical processing units (GPUs) and network adapters, for example.

The end-point device 102 has a drive housing 102*a* which connects the end-point device 102 to a bus 60 (FIG. 1) which may be a PCIe serial bus, for example. The drive housing 102*a* encloses a memory or storage device 103 having an array 105 of nonvolatile bitcells such as an array of NAND bitcells, configured to store data in a persistent manner, and a memory controller 107 configured to control memory read and memory write operations directed to the bitcell array 105. In one embodiment, the memory controller 107 and bitcell array 105 are packaged within a single package. It is appreciated that in other embodiments, the some or all components of the memory controller 107 and bitcell array 105 may be disposed on different dies or within different packages or devices. For example, some or all components of the memory 107 may be a part of a system on a chip (SoC) whereas some or all components of the bitcell array 105 may be disposed within an end-point device coupled by a bus to the SoC.

In one embodiment, the bitcell array 105 may includes cells of a single level cell (SLC), a triple level cell (TLC), quad level cell (QLC or other multilevel cell (MLC) word line types. In a QLC memory embodiment, the bitcell array 105 may be organized in blocks and planes, for example. It is appreciated that the bitcell array 105 may be organized in units and subunits of other sizes and types, depending upon the particular application.

In accordance with one aspect of memory resource allocation in an end-point device in accordance with the present description, the memory controller 107 further includes memory resource allocation logic 134 configured to be responsive to an address space configuration request from a host 138 (FIG. 3) requesting configuration of an address space of the end-point device 102. In one embodiment, the request includes all the appropriate information for configuring a mapped address space of the end-point device, including one or more address space resize parameters, each such parameter defining a size of a mapped address space for a BAR register to size or resize the mapped address space associated with each BAR register.

In configuring the address space of the end-point device, multiple BAR registers may be set to size or re-size the address space associated with each BAR register, in response to the address space configuration request from the host. Upon completion of the address space configuration request from the host, the end-point device 102 generates and sends to the host an address space configuration completion notice. Thus, memory resource allocation in an end-point device in accordance with the present description includes a handshake mechanism between the host and an end-point device which can configure the mapped address spaces of multiple BAR registers of the end-point device with as few as a single configuration request from the host and a single configuration completion notice from the end-point device.

Figure 4:
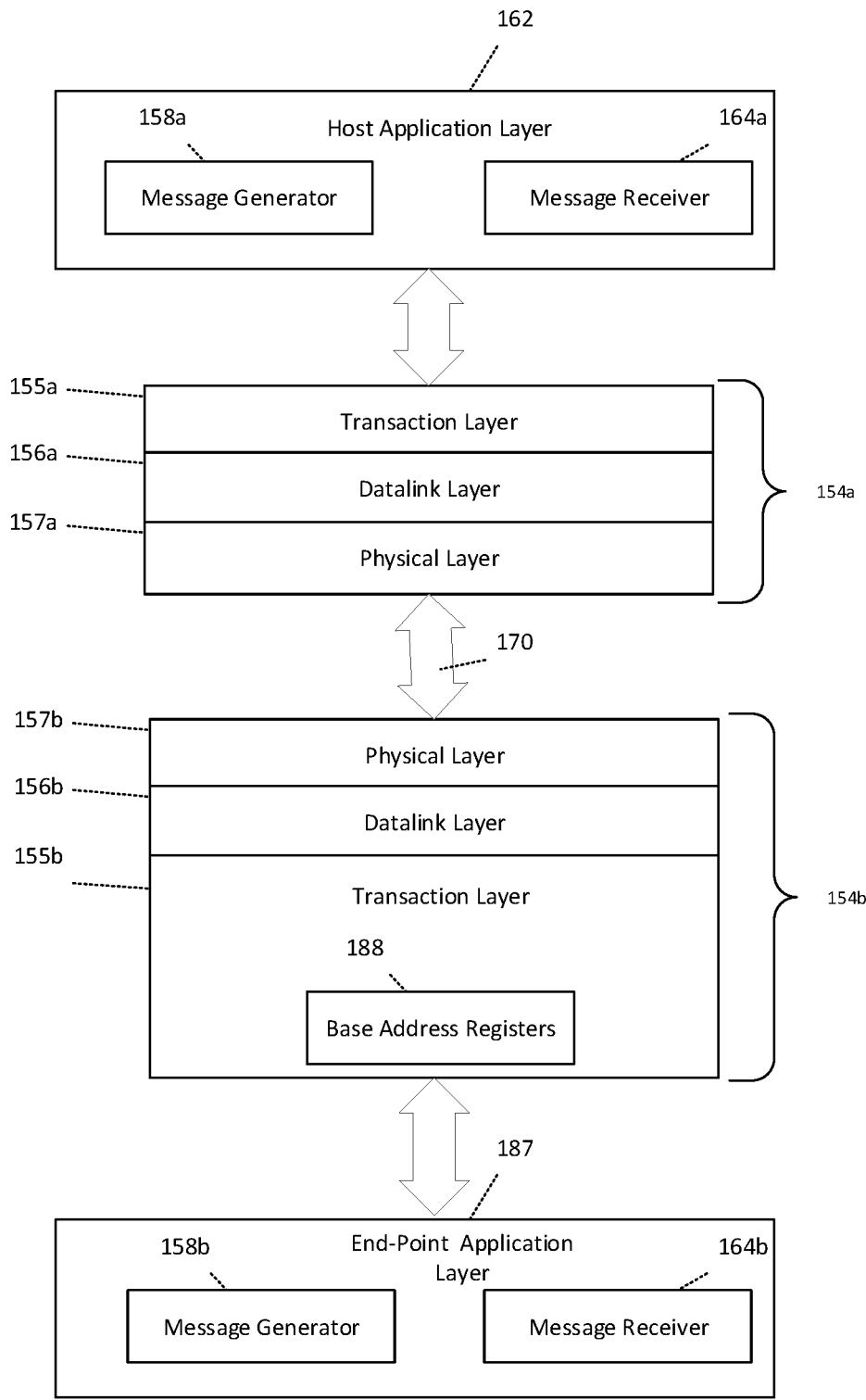
FIG. 4 depicts an example of a multi-protocol layer communication path between a host and an end-point device employing memory resource allocation n accordance with the present description.

In the illustrated embodiment, the address space configuration request from a host is received by communication logic 144 which in one embodiment, is configured to communicate through multi-protocol layer (MPL) stacks 154a, 154b (FIG. 4) of the host 138 and the end-point device 102, respectively. As described in greater detail below, each MPL stack 154a, 154b includes a transaction layer 155a, 155b, data link layer 156a, 156b and a physical layer 157a, 157b as shown in FIG. 4. In the illustrated embodiment, the MPL stacks 154a, 154b conform to the PCIe Specification. However, it is appreciated that other communication protocols may be utilized, depending upon the particular application.

Figure 3:
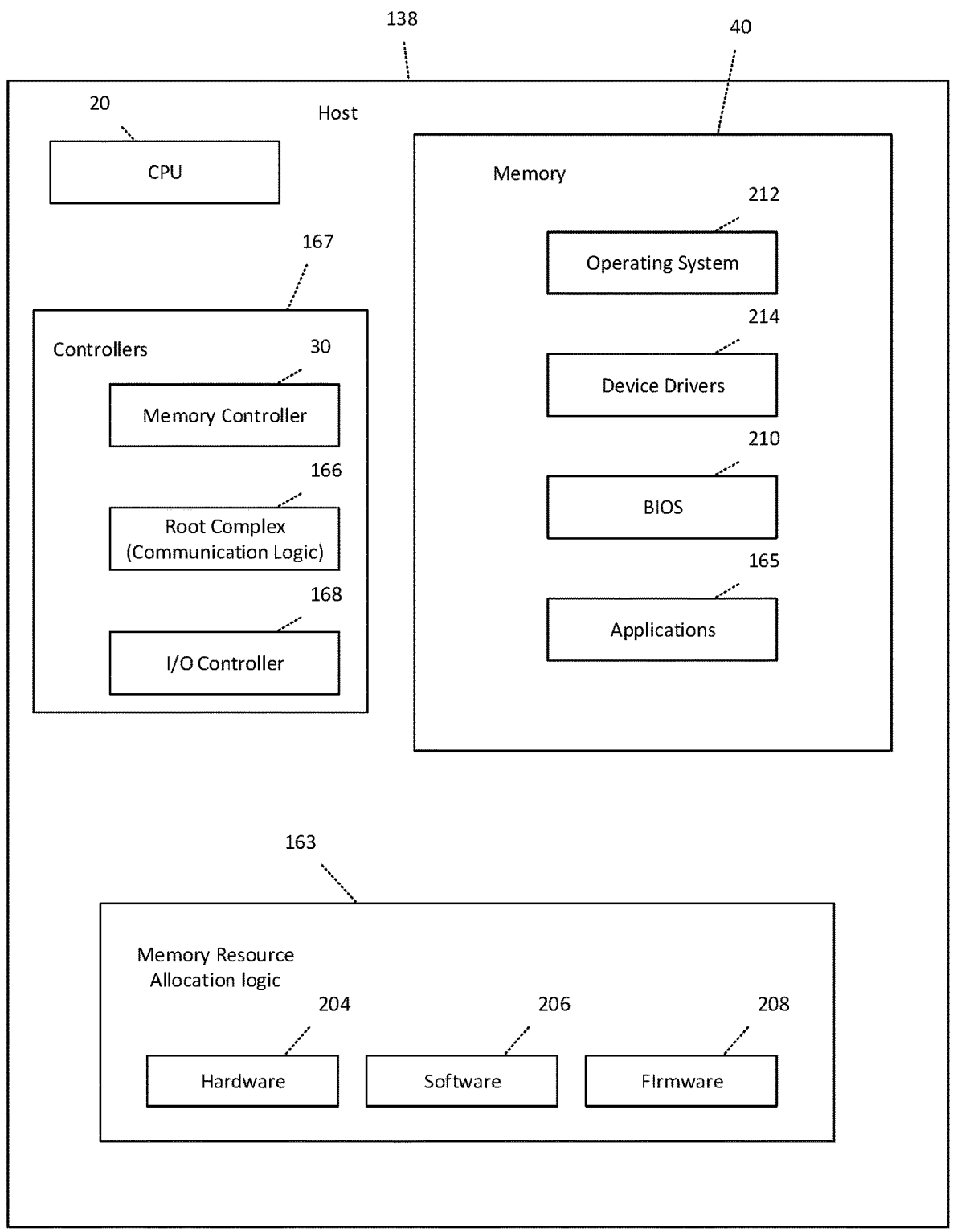
FIG. 3 illustrates an example of a host employing memory resource allocation in accordance with the present description.

The memory resource allocation logic 134 is further configured to cause the communication logic 144 to, in response to the address space configuration request, issue a completion notice to the requesting host 138 (FIG. 3) upon completion of a requested address space configuration. In one embodiment, the address space configuration request is a multi-protocol layer (MPL) stack request message generated by a message generator 158a (FIG. 4) such as a Vendor Defined Message (VDM) generator, of an application layer 162 of memory resource allocation logic 163 of the host 138 (FIG. 3). The application layer 162 of the host also includes a VDM message receiver 164a. The application layer 162 of the memory resource allocation logic 163 of the host 138 may be implemented with one or more applications 165 (FIG. 3) of the host 138.

A Vendor Defined Message (VDM) is in general a message feature provided by the PCIe Specification which defines a standard format of a VDM message complying with the PCIe standard as shown in FIG. 5. As noted above, an address space configuration request message from a host 138 (FIG. 3) requesting configuration of an address space of the end-point device 102, can include all the appropriate information for configuring a mapped address space of the end-point device, including at least one address space resize parameter defining one or more expanded or different sizes of a requested address space resizing. Thus, a VDM message configured as an address space configuration request message in accordance with memory resource allocation in accordance with the present description, may be modified to include a payload beginning at byte 12 (the message area reserved for "vendor definition" as depicted in FIG. 5) to carry from the host 138 to the end-point device 102, all the appropriate information for configuring a mapped address space of the end-point device, such as, for example, at least one address space resize parameter defining one or more expanded or different sizes of a requested address space resizing.

In one embodiment, the address space resize parameter is a mapped base address offset within the mapped address space to define a memory region of a different size than that of the original setting of the BAR registers. The mapped address space may be within the address space managed by the operating system or in some embodiments, may be within the address space managed by the CPU, or both. Such a base address may be 32 bits long in some embodiments or 64 bits long in others, for example. Other parameters of the payload may include a length field identifying the lengths of the BAR register settings or the length of the entire VDM payload or the entire length of the VDM message. Still other parameters of the payload may include an identification of the particular BAR register or registers which are being configured by the VDM message. It appreciated that the VDM payload may include other parameters for resizing memory regions allocated to an end-point device, depending upon the particular application.

The message generator 158a (FIG. 4) of the host application layer 162 is configured to cause communication logic such as a root complex 166 (FIG. 3) of the controllers 167 of the host 138 to package and transmit the address space configuration request message to the end-point device 102. The root complex 166 may be implemented as a discrete device or may be integrated with the CPU 20 as a system on a chip (SoC) for example. Although communication logic of the host 138 is depicted as a root complex in the embodiment of FIG. 3, it is appreciated that a host employing memory resource allocation in accordance with the present description, may utilize other types of communication logic, depending upon the particular application. For example, communication logic may be employed in other types of controllers such as the I/O controller 168 of the controllers 167.

In the illustrated embodiment, the root complex 166 connects the CPU 20 and memory 40 of the host 138 to a PCI Express (PCIe) fabric 170 (FIG. 4) of the busses 60 (FIG. 1), which includes one or more links and may also include one or more switch devices. The fabric 170 is in turn coupled to the end-point devices of the system 10 including the end-point device 102 (FIG. 2).

The root complex 166 packages the address space configuration request message generated by the message generator 158a (FIG. 4) of host for transmission to the end-point device 102 over the fabric 170. In the illustrated embodiment, the root complex 166 implements a multi-protocol layer (MPL) stack 154a similar to the MPL stack 154b of the communication logic 144 (FIG. 2) of the end-point device 102 to generate and transmit an MPL packet 172a (FIG. 6a) to the end-point device 102. Thus, in one embodiment, a transaction layer 155a (FIG. 4) of the MPL stack 154a packages the address space configuration request message generated by the message generator 158a of the host application layer 162, in a host transaction layer packet (TLP) 174a (FIG. 6a) in a VDM header and payload section 176a of the host transaction layer packet 174a. The host application layer 162 or the host transaction layer 155a also generates an end-point check code such as a cyclic redundancy check (CRC) code, for example, for identifying any transmission errors of the header and payload message section 176a containing the address space configuration request message. The transaction layer 155a packages the check code in a check code section 178a appended to the end of the header and payload message section 176a of the transaction layer packet (TLP) 174a.

One function of the datalink layers 156a, 156b (FIG. 4) of this embodiment is to ensure proper sequencing of the transaction layer packets being sent between the host 138 and the end-point device 102 as set forth in the PCIe Specification. Accordingly, in this embodiment, the host datalink layer 156a appends a sequence header section 180a (FIG. 6a) to the front of the transaction layer packet 174a, and also appends a check code section 182a to the end of the transaction layer packet 174a created by the host transaction layer 155a (FIG. 4). The sequence header section 180a includes an incremented sequence number which provides a unique identification tag for each transmitted transaction layer packet.

In this embodiment, the datalink layers 156a, 156b also ensure reliable delivery of the transaction layer packet 174a (FIG. 6a) via a suitable acknowledgement protocol such as for example, utilizing acknowledgement (e.g. ACK) and negative acknowledgement (e.g. NAK) signals as set forth in the PCIe Specification. The datalink layers 156a, 156b (FIG. 4) further initialize and manage flow control between the host 138 (FIG. 3) and the end-point device 102 (FIG. 2) utilizing for example, flow control credits as set forth in the PCIe Specification.

The physical layer 157a (FIG. 4) of the host 138 (FIG. 3) marks the start of the MPL packet 172a (FIG. 6a) with a start marker 184a and marks the end of the MPL packet 172a with an end marker 186a. The MPL packet 172a is converted to a serial stream by the physical layer 157a (FIG. 4) which transmits the serial stream over the fabric 170 to the end-point device 102 (FIG. 2).

Upon receipt of the serial stream, the physical layer 157b (FIG. 4) of the communication logic 144 (FIG. 2) of the end-point device 102 de-serializes the stream and the de-serialized data of the stream (minus the start and end markers 184a, 184b, respectively, (FIG. 6a)) is forwarded to the datalink layer 156b (FIG. 4) which validates the sequence number of the section 180a (FIG. 6a) and the redundancy check of the section 182a. If the datalink redundancy check based on the section 182a fails or the datalink sequence number of the section 180a is out of range (e.g. not consecutively numbered with the last received transaction layer packet), then the transaction layer packet 174a is considered to be invalid and a negative acknowledgement (e.g. NAK) is returned to the host 138 (FIG. 2) with the sequence number of the invalid transaction layer packet.

Conversely, if the datalink redundancy check based on the section 182a passes and the datalink sequence number of the section 180a is the correct sequence number (e.g. consecutively numbered with the last received transaction layer packet), then the transaction layer packet 174a is considered to be valid and is forwarded to the transaction layer 155b of the communication logic 144 of the end-point device 102. In addition, a positive acknowledgement (e.g. ACK) is returned to the host 138 (FIG. 2) indicating to the host successful receipt of a valid transaction layer packet by the end-point device 102. Positive and negative acknowledgement signals are packaged as datalink layer packets (DLLPs) as are some power management message and flow control credit information.

Upon receipt of the transaction layer packet 174a, the transaction layer 155b extracts the address space configuration request message of section 176a, and the redundancy check of section 178a from the transaction layer packet 155a and forwards them to a message receiver 164b (FIG. 4) of an application layer 187 of the end-point device 102 (FIG. 2). The end-point message receiver 164b validates the address space configuration request message using the redundancy check of section 178a from the transaction layer 155b. If the address space configuration request message of section 176a passes the redundancy check of section 178a, the address space configuration request message of section 176a is considered to be valid.

The end-point message receiver 164b of the end-point application layer 187 is configured to parse the address space configuration request message to extract the information needed for the requested address space configuration. In one aspect of the present description, there is an agreement between the host application layer 162 (FIG. 4) and the end-point application layer 187 as to VDM message framing rules such as rules governing the type and formatting of the information packaged by the host in the address space configuration request message received by the end-point device 102. In that the type and formatting of the information packaged by the host in the address space configuration request message is known in advance by the end-point device 102, the end-point message receiver 164b of the end-point application layer 187 may be readily configured to parse the address space configuration request message to extract the information needed for the requested address space configuration. If some or all of the extracted information is encrypted by the host in accordance with the agreement, the end-point message receiver 164b may be readily configured to decrypt any encrypted address space configuration request information.

Upon extraction and decoding of the address space configuration request information, the memory resource allocation logic 134 (FIG. 2) of the end-point device causes the configuration of one or more Base Address Registers 188 of the transaction layer 155b of the end-point device. FIG. 7 depicts in table form a known format of a data structure which includes Base Address Registers (BAR registers). Accordingly, the Base Address registers 188 of the end-point device 102 may be implemented in a similar data structure, for example, as a data structure of the data structures 189 (FIG. 2)

Thus, upon receipt and decoding of the address space configuration request message transmitted via the transaction layer packet 174a (FIG. 6a) from the host 138 (FIG. 3) to the end-point device 102 (FIG. 2), some or all of the BAR registers 188 may updated to resize the associated address spaces utilizing the information extracted from the address space configuration request message. It is appreciated that there are a variety of suitable mechanisms which may be used to update the BAR registers 188 (FIG. 4) in the PCIe stack 154*b*. For example, the memory resource allocation logic 134 (FIG. 2) of the end-point device 102 may be configured using one or more of hardware 190, software 192, and firmware 194, alone or in combination, to store updated address space data in the BAR register 188, and complete the address space configuration of the end-point device 102, based upon the information extracted from the address space configuration request message.

In one embodiment, the memory resource allocation logic 134 (FIG. 2) of the end-point device 102 may perform and complete address space configuration of the end-point device 102, based upon the information extracted from the address space configuration request message from the host 138 (FIG. 3) without further input from the host 138. In another embodiment, the memory resource allocation logic 163 (FIG. 3) of the host 138 may cooperate with the memory resource allocation logic 134 (FIG. 2) of the end-point device 102 in performance and completion of the address space configuration of the end-point device 102. The memory resource allocation logic 163 (FIG. 3) of the host 138 may be configured using one or more of hardware 204, software 206, and firmware 208, alone or in combination. In one example, the memory resource allocation logic 163 of the host 138 configures settings of a host Basic Input Out System (BIOS) 210 prior to initiation of PCIe enumeration by one or more of an operating system 212 and device drivers 214. Other mechanisms may be utilized to cooperate in the performance and completion of address space configuration of the end-point device 102, based upon the information complementing the information contained within the address space configuration request message from the host 138.

The memory resource allocation logic 134 is further configured to, upon completion of the address space configuration of the BAR registers 188, to generate and send an address space configuration completion notice to the host 138 (FIG. 3) which requested configuration of the address spaces of the end-point device 102. In one embodiment, the address space configuration completion notice is a multi-protocol layer (MPL) stack completion notice message generated by a message generator 158*b* (FIG. 4) such as a Vendor Defined Message (VDM) generator, of the application layer 187 of memory resource allocation logic 134 of the end-point device 102 (FIG. 2). Thus, a VDM message configured as an address space configuration completion notice message in accordance with memory resource allocation in accordance with the present description, may be modified to include a payload beginning at byte 12 (the message area reserved for "vendor definition" as depicted in FIG. 5) to carry from the end-point device 102 to the host 138, all the appropriate information to signal to the host 138 the completion of the requested address space configuration.

The message generator 158*b* (FIG. 4) of the end-point application layer 187 is configured to cause the communication logic 144 of the end-point device 102 to package and transmit the address space configuration completion notice to the host 138. Thus, in one embodiment, the transaction layer 155*b* (FIG. 4) of the MPL stack 154*b* packages the address space configuration completion notice message generated by the message generator 158*b* of the end-point application layer 187, in an end-point transaction layer packet (TLP) 174*b* (FIG. 6*b*) in a VDM header and payload section 176*b* of the end-point transaction layer packet 174*b*. The end-point application layer 187 or the end-point transaction layer 155*b* also generates an end-point check code such as a cyclic redundancy check (CRC) code, for example, for identifying any transmission errors of the header and payload message section 176*b* containing the address space configuration completion message. The transaction layer 155*b* packages the check code in a check code section 178*b* appended to the end of the header and payload message section 176*b* of the transaction layer packet (TLP) 174*b*.

In this embodiment, the end-point datalink layer 156*b* appends a sequence header section 180*b* (FIG. 6*b*) to the front of the transaction layer packet 174*b*, and also appends a check code section 182*b* to the end of the transaction layer packet 174*b* created by the end-point transaction layer 155*b* (FIG. 4). The sequence header section 180*b* includes an incremented sequence number which provides a unique identification tag for each transmitted transaction layer packet.

The physical layer 157*b* (FIG. 4) of the end-point device 102 (FIG. 2) marks the start of the MPL packet 172*b* (FIG. 6*a*) with a start marker 184*b* and marks the end of the MPL packet 172*a* with an end marker 186*b*. The MPL packet 172*b* is converted to a serial stream by the physical layer 157*b* (FIG. 4) which transmits the serial stream over the fabric 170 to the host 138 (FIG. 3).

Upon receipt of the serial stream, the physical layer 157*a* (FIG. 4) of the root complex 166 (FIG. 3) of the host 138 de-serializes the stream and the de-serialized data of the stream (minus the start and end markers 184*b*, 186*b*, respectively, (FIG. 6*b*)) is forwarded to the datalink layer 156*a* (FIG. 4) which validates the sequence number of the section 180*b* (FIG. 6*a*) and the redundancy check of the section 182*b*. If the datalink redundancy check based on the section 182*b* fails or the datalink sequence number of the section 180*b* is out of range (e.g. not consecutively numbered with the last received transaction layer packet), then the transaction layer packet 174*b* is considered to be invalid and a negative acknowledgement (e.g. NAK) is returned to the end-point device 102 (FIG. 2) with the sequence number of the invalid transaction layer packet.

Conversely, if the datalink redundancy check based on the section 182*b* passes and the datalink sequence number of the section 180*b* is the correct sequence number (e.g. consecutively numbered with the last received transaction layer packet), then the transaction layer packet 174*b* is considered to be valid and is forwarded to the transaction layer 155*a* of the root complex 166 of the host 138. In addition, a positive acknowledgement (e.g. ACK) is returned to the end-point device 102 indicating to the end-point device 102 successful receipt of a valid transaction layer packet by the host 138.

Upon receipt of the transaction layer packet 174*b*, the transaction layer 155*a* extracts the address space configuration completion message of section 176*b*, and the redundancy check of section 178*b* from the transaction layer packet 155*a* and forwards them to a message receiver 164*a* (FIG. 4) of the host application layer 162. The host message receiver 164*a* validates the address space configuration completion message using the redundancy check of section 178*b* from the transaction layer 155*a*. If the address space configuration completion message of section 176*b* passes the redundancy check of section 178*b*, the address space configuration completion message of section 176*b* is considered to be valid, and the requested address space configuration is considered to be complete.

The end-point message receiver 164*b* of the host application layer 162 is configured to parse the address space configuration completion message to extract the information needed for confirmation of the completion of the requested address space configuration. In one aspect of the present description, there is an agreement between the host application layer 162 (FIG. 4) and the end-point application layer 187 as to VDM message framing rules such as rules governing the type and formatting of the information packaged by the end-point device 102 in the address space configuration completion message received by the host 138. In that the type and formatting of the information packaged by the end-point device in the address space configuration completion message is known in advance by the host 138, the host message receiver 164a of the host application layer 166 may be readily configured to parse the address space configuration completion message to extract the information needed to confirm completion of the requested address space configuration. If some or all of the extracted information is encrypted by the end-point device in accordance with the agreement, the host message receiver 164a may be readily configured to decrypt any encrypted address space configuration completion information.

In another aspect of the present description, a mailbox mechanism may be implemented to facilitate the exchange of VDM messages in a handshake mechanism for address space configuration in accordance with the present description. For example, a host BIOS-PCIe VDM mailbox mechanism may be utilized to inject a VDM address space configuration request message over the fabric 170 to the end-point device 102. In one embodiment, the mailbox may be implemented in the root complex 166 (FIG. 3) of the host using a suitable register or an application layer on top of the PCIe root port that can transmit the request message through the PCIe root port to the end-point device.

In another aspect of the present description, it is appreciated that an address space allocation handshake mechanism between a host and an end-point device to resize BAR registers of the end-point device, may be implemented using communication modes other than VDM messages. For example, an address space allocation request and an address space allocation completion notice may be embedded in one or more data structures such as a Vendor-Specific Extended Capability (VSEC) data structure to exchange BAR resizing handshake information.

A VSEC data structure is in general a data structure feature provided by the PCIe Specification which defines a standard format of a VSEC data structure complying with the PCIe standard. A VSEC data structure typically includes a header followed by vendor defined registers and other data fields, and is stored in the end-point device by the host. As per the PCIe standard, the host populates the VSEC data structure using one or more configuration write (CfgWr) transactions, each embedded in a transaction layer packet sent from the host to the end-point device. The end-point device acknowledges to the host a successful write to the VSEC data structure with a completion without data (CpL) transaction embedded in a transaction layer packet sent from the end-point device to the host. The host may read header, register and data fields of the VSEC using a configuration read request (CfgRd) transaction embedded in a transaction layer packet and the end-point device responds with a completion with data transaction (CpLD) embedded in a transaction layer packet to provide the read data to the host.

As noted above, an address space configuration request from a host 138 (FIG. 3) requesting configuration of an address space of the end-point device 102, can include all the appropriate information for configuring a mapped address space of the end-point device, including at least one address space resize parameter defining one or more expanded or different sizes of a requested address space resizing. Thus, a VSEC data structure configured as an address space configuration request in accordance with memory resource allocation in accordance with the present description, may be modified to include data fields to store in the end-point device 102, all the appropriate information for configuring a mapped address space of the end-point device, including at least one address space resize parameter defining one or more expanded or different sizes of a requested address space resizing.

FIG. 8 depicts one example of a known Vendor-Specific Header format for a Vendor-Specific Extended Capability (VSEC) data structure defined by a PCIe Specification. In this example, the header field "VSEC Vendor ID" identifies the that defined the contents of the VSEC data structure. The header field VSEC Revision is a vendor-defined version number that indicates the version of the VSEC structure. In some implementations, the application layer qualifies the VSEC Vendor ID and a VSEC ID before interpreting the revision field.

The header field "VSEC Length" indicates the number of bytes in the entire VSEC data structure, including the header or headers, and any vendor specific registers or other data fields. The length of a VSEC data structure is not limited by PCIe Specification. Thus, it is appreciated herein that a VSEC data structure modified in accordance with memory resource allocation and re-allocation of the present description can readily accommodate all the appropriate information for configuring a mapped address space of the end-point device, including at least one address space resize parameter defining one or more expanded or different sizes of a requested address space resizing. In one embodiment, a VSEC data structure modified in accordance with address space configuration of the present description, implements one or more BAR-resizing related read/write registers for information exchange between the host and the end-point device in which the address space is being configured.

In a manner similar to that described above in connection with a VDM payload, the data fields of the VSEC data structure, in one embodiment, include an address space resize parameter which is a mapped base address offset within the mapped address space to define a memory region of a different size than that of the original setting of the BAR registers. The mapped address space may be within the address space managed by the operating system or in some embodiments, may be within the address space managed by the CPU, or both. Such a base address may be 32 bits long in some embodiments or 64 bits long in others, for example. Other parameters of the payload may include a length field identifying the lengths of the BAR register settings or the length of the entire VSEC data fields or the entire length of the VSEC data structure as noted above. Still other parameters of the payload may include an identification of the particular BAR register or registers which are being configured by the VSEC data structure. It appreciated that the VSEC data structure may include other parameters for resizing memory regions allocated to an end-point device, depending upon the particular application.

Thus, in one embodiment, the address space configuration request is implemented in a VSEC data structure of the data structures 189 (FIG. 2) which is caused to be created and populated by a multi-protocol layer (MPL) stack request transaction generated by a transaction generator 302a (FIG. 9a) such as a VSEC data structure transaction generator, of the application layer 162 of memory resource allocation logic 163 of the host 138 (FIG. 3). The application layer 162 of the host also includes a transaction receiver 304a.

In the illustrated embodiment, the multi-protocol layer (MPL) stack request transaction generated by a transaction generator 302a (FIG. 9a) is a configuration write (CfgWr) transaction which is configured to write all the appropriate information for configuring a mapped address space of the end-point device, including at least one address space resize parameter defining one or more expanded or different sizes of a requested address space resizing. The root complex 166 packages the address space configuration request transaction and associated information generated by the transaction generator 302a (FIG. 9a) of host, for transmission to the end-point device 102 over the fabric 170 in a manner similar to that described above for transmission of the VDM request message. Thus, in the illustrated embodiment, the root complex 166 implements a multi-protocol layer (MPL) stack 154a to generate and transmit an MPL packet 308a (FIG. 10a) to the end-point device 102. In one embodiment, a transaction layer 155a (FIG. 4) of the MPL stack 154a packages the address space configuration request transaction generated by the transaction generator 302a of the host application layer 162, in a host transaction layer packet (TLP) 312a (FIG. 10a) in a section 316a of the host transaction layer packet 312a containing a VSEC header, register and data fields. The MPL packet 308a is completed and transmitted to the end-point device 102 in a manner similar to that described above in connection with the MPL packet 172a of FIG. 6a.

Upon receipt of the MPL packet 308a by the end-point device, the MPL packet 308a is processed by the MPL stack 154b in a manner similar to that described above in connection with the MPL packet 172a of FIG. 6a. Upon receipt of the transaction layer packet 312a, the transaction layer 155b extracts the address space configuration request transaction of section 316a, and the redundancy check of section 178a from the transaction layer packet 312a and forwards them to a transaction receiver 304b (FIG. 9b) of the application layer 187 of the end-point device 102 (FIG. 2). The end-point transaction receiver 304b validates the address space configuration request transaction using the redundancy check of section 178a from the transaction layer 155b. If the address space configuration request transaction of section 316a passes the redundancy check of section 178a, the address space configuration request transaction of section 316a is considered to be valid. Accordingly, the configuration write transaction of the address space configuration request transaction of section 316a is executed, creating and populating a VSEC data structure with all the information appropriate for configuring one or more address spaces including configuring the associated BAR registers of the end-point device 102.

The end-point transaction receiver 304b of the end-point application layer 187 is configured to parse the address space configuration VSEC data structure to extract the information needed for the requested address space configuration. Here too, in one aspect of the present description, there is an agreement between the host application layer 162 (FIG. 4) and the end-point application layer 187 as to address space configuration VSEC data structure framing rules such as rules governing the type and formatting of the information packaged by the host in the address space configuration VSEC data structure written in response to the configuration write transaction sent to the end-point device 102. In that the type and formatting of the information packaged in the address space configuration VSEC data structure is known in advance by the end-point device 102, the end-point message receiver 164b of the end-point application layer 187 may be readily configured to parse the address space configuration VSEC data structure to extract the information needed for the requested address space configuration. If some or all of the extracted information is encrypted by the host in accordance with the agreement, the end-point message receiver 164b may be readily configured to decrypt any encrypted address space configuration request information.

Upon extraction and decoding of the address space configuration request information by the memory resource allocation logic 134 (FIG. 2) of the end-point device, one or more Base Address Registers 188 of the transaction layer 155b of the end-point device may be updated to configure the address space of the end-point device in a manner similar to that described above in connection with the VDM address space configuration message. Thus, the BAR registers 188 may be updated to resize the associated address spaces utilizing the information extracted from the address space configuration VSEC data structure.

The memory resource allocation logic 134, upon completion of the address space configuration of the BAR registers 188, generates and sends an address space configuration completion notice to the host 138 (FIG. 3) which requested configuration of the address spaces of the end-point device 102. In one embodiment, the address space configuration completion notice may be generated by the transaction generator 302b of the end-point application layer 187 in the form of a completion with data (CpLD) transaction embedded in a transaction layer packet in response to a configure read (CfgRd) transaction sent by the host 138 and embedded in a transaction layer packet. The configuration read transaction from the host may be directed to a completion flag register, for example, of the address space configuration VSEC data structure, which is set when the requested address space configuration is completed. The completion with data transaction returned to the host in response to the configuration read transaction from the host may contain, for example, the contents of the completion flag register to indicate to the host the completion of the requested address space configuration.

Thus, in one embodiment, the transaction layer 155b (FIG. 4) of the MPL stack 154b packages the read data accompanying an address space configuration completion transaction generated by the transaction generator 302b of the end-point application layer 187, in an end-point transaction layer packet (TLP) 312b (FIG. 10b) having a completion with data section transaction section 316b of the end-point transaction layer packet 312b. The MPL packet 308b is completed and transmitted to the host 138 in a manner similar to that described above in connection with the MPL packet 172b of FIG. 6b.

In another embodiment, the address space configuration completion notice may be sent to the host by the transaction generator 302b of the end-point application layer 187 in the form of a VDM message as described above in connection with FIG. 6b. In yet another embodiment, the address space configuration completion notice may be sent to the host by the transaction generator 302b of the end-point application layer 187 in the form of a configure write (CfgWr) transaction embedded in a transaction layer packet. The configuration write transaction may be directed to create and populate a VSEC data structure in the host in which the host VSEC data structure includes a completion flag register which is set by the end-point device when the requested address space configuration is completed. The configuration write transaction may be generated and sent by the end-point device in a manner similar to that described above for the configuration write transaction generated and sent by the host to the end-point device. It is appreciated that other communication forms may be utilized to send an address space configuration completion notice to the host.

In another aspect of memory resource allocation in accordance with the present description, an address space configuration request may include an enable flag register parameter which populates a BAR resizing enable register of the end-point device to enable address space resizing with a handshake mechanism as described herein. Such a BAR resizing enable register may be, for example, a data structure of the data structures 189 of the end-point device. In the VSEC data structure embodiment described above, the BAR resizing enable register may be a register of the VSEC data structure, for example.

In one embodiment, setting the BAR resizing enable register to enable address space allocation by a handshake mechanism as described herein, may be limited to a host capable of participating in address space allocation by a handshake mechanism as described herein. Thus, if an end-point device is paired with a host which is not capable of participating in the address space allocation handshake mechanism, the end-point device advertises minimum BAR register sizes at start-up for its functions including enhanced functions which the host may be incapable of utilizing. This will ensure that the end-point device can function together with hosts which may be incapable of address space allocation by the handshake mechanism.

For example, the end-point device can provision a "BAR-resizing enable" register storing a default value of "0", for example, which indicates that the handshake mechanism for memory resource allocation is currently disabled. However, should a host support address space allocation by the handshake mechanism, the host can set the "BAR-resizing enable" register to '1' to enable the handshake mechanism for memory resource allocation. For example, a VDM address space configuration request message or VSEC address space configuration request as set forth above, may include a BAR resizing enable register parameter to set the BAR resizing enable register to enable address space allocation by the handshake mechanism.

Here too, the end-point application layer 187 is configured to parse the VDM or VSEC address space configuration request to extract the BAR resizing enable register parameter from the message or data structure to set the BAR resizing enable register to indicate that address space allocation by the handshake mechanism is enabled. The agreement between the host application layer 162 (FIG. 4) and the end-point application layer 187 as to VDM message or VSEC data structure framing rules govern the type and formatting of the BAR resizing enable register parameter packaged by the host in the address space configuration request received by the end-point device 102, to facilitate extraction of the parameter from the request.

As noted above, a handshake mechanism for memory resource allocation can be very efficient if multiple BAR registers in one or more functions of the end-point device are to be reconfigured. More specifically, a single configuration request can configure multiple BAR registers to resize multiple address spaces of the end-point device. In one embodiment, a single resize parameter of the VDM or VSEC request may be used to configure multiple BAR registers to have various different sizes. For example, the single resize parameter of the request may be a table or index of BAR register configuration values implemented at the device application layer based on the agreement knowledge from the host. Upon receipt of the table or index values by the end-point device through the handshake mechanism, the end-point device has the information needed to calculate the actual base address values for all related BAR registers in the device based on the host's choice of table or index information. In addition, this method is more secure than the known procedure discussed above since it can hide the actual base address values from the physical PCIe links or lanes.

Figure 11:
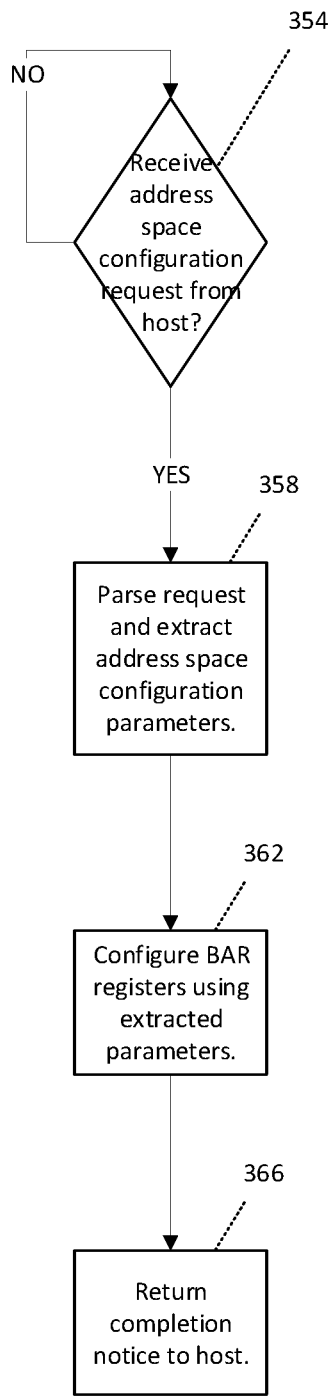
FIG. 11 illustrates an example of operations of an end-point device employing memory resource allocation in accordance with the present description.

FIG. 11 depicts one example of an end-point device employing memory resource allocation in accordance with the present description. In this example, system memory management of the host 138 (FIG. 3) which may be implemented in one or more of the operation system 212, device drivers 214, BIOS 210 or applications 165, determines that it is appropriate to resize one or more of the mapped address spaces of an end-point device. For example, the host 138 may select to operate the end-point device in an enhanced mode which requires different or larger mapped memory spaces than the default values. Accordingly, the host 138 causes the application layer 162 (FIG. 4) of the memory resource allocation logic 163 (FIG. 3) to generate an address space configuration request which may be in the form of a VDM request message 176a (FIG. 6a) embedded in a transaction layer packet 174a by the root complex 166 (FIG. 3) or in the form of a VSEC configuration write transaction 316a (FIG. 10a) embedded in a transaction layer packet 312a, for example, as described above. The address space configuration request is embedded in an MPL packet 172a (FIG. 6a) or 308a (FIG. 10a) and transmitted to the end-point device over a PCIe link 170 (FIG. 4) by the root complex 166 (FIG. 3) as described above.

Upon receipt (block 354, FIG. 11) by the end-point device of the address space configuration request from the host 138 (FIG. 3) embedded in an MPL packet, the communication logic 144 (FIG. 2) of the end-point device extracts the address space configuration request and the end-point application layer parses (block 358, FIG. 11) the extracted address space configuration request to extract the address space configuration parameters from the address space configuration request. An agreement between the host application layer 162 (FIG. 4) and the end-point application layer 187 as to VDM message or VSEC data structure framing rules governing the type and formatting of the information packaged by the host in the address space configuration request, facilitates the parsing and extraction of the address space configuration parameters from the request. Any encrypted parameters may be decrypted in accordance with the host/device agreement which may also govern encryption/decryption processes.

Using the address space configuration parameters extracted (block 358, FIG. 11) from the address space configuration request received by the end-point device, one or more BAR registers of the end-point device may be configured (block 362, FIG. 11) to update the sizes of the mapped address spaces associated with each updated BAR register. The memory resource allocation logic 134, upon completion of the address space configuration of the BAR registers 188, generates and sends (block 366, FIG. 11) an address space configuration completion notice to the host 138 (FIG. 3) which requested configuration of the address spaces of the end-point device 102. Accordingly, the end-point device 102 causes the application layer 187 (FIG. 4) of the memory resource allocation logic 134 (FIG. 3) to generate an address space configuration completion notice which may be in the form of a VDM completion message 166b (FIG. 6b) embedded in a transaction layer packet 174b by the communication logic 144 (FIG. 2) or in the form of a VSEC configuration completion transaction 316*b* (FIG. 10*a*) embedded in a transaction layer packet 312*b*, for example, as described above. The address space configuration completion notice transaction layer packet is embedded in an MPL packet 172*b* (FIG. 6*b*) or 308*b* (FIG. 10*b*) and transmitted to the host over a PCIe link 170 (FIG. 4) by the communication logic 144 (FIG. 2) as described above.

The described operations may be implemented as a method, apparatus or computer program product using standard programming and/or engineering techniques to produce software, firmware, hardware, or any combination thereof. The described operations may be implemented as code maintained in a "computer readable storage medium", where a processor may read and execute the code from the computer storage readable medium. The computer readable storage medium includes at least one of electronic circuitry, storage materials, inorganic materials, organic materials, biological materials, a casing, a housing, a coating, and hardware. A computer readable storage medium may comprise, but is not limited to, a magnetic storage medium (e.g., hard disk drives, floppy disks, tape, etc.), optical storage (CD-ROMs, DVDs, optical disks, etc.), volatile and nonvolatile memory devices (e.g., EEPROMs, ROMs, PROMs, RAMs, DRAMs, SRAMs, Flash Memory, firmware, programmable logic, etc.), Solid State Drives (SSD), etc. The code implementing the described operations may further be implemented in hardware logic implemented in a hardware device (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The program code embedded on a computer readable storage medium may be transmitted as transmission signals from a transmitting station or computer to a receiving station or computer. A computer readable storage medium is not comprised solely of transmission signals. Those skilled in the art will recognize that many modifications may be made to this configuration, and that the article of manufacture may comprise suitable information bearing medium known in the art.

Computer program code for carrying out operations for aspects of the certain embodiments may be written in any combination of one or more programming languages. Blocks of the flowchart and block diagrams may be implemented by computer program instructions.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments has been presented for the purposes of illustration and description. It is not intended to be exhaustive or to be limited to the precise forms disclosed. Many modifications and variations are possible in light of the above teaching.

Examples

The following examples pertain to further embodiments.

Example 1 is an apparatus for use with a host, comprising: an end-point device having at least one base address register, and memory resource allocation logic configured to: receive a request from a host requesting configuration of an address space of the end-point device wherein the request includes at least one address space resize parameter defining a changed size of a requested address space resizing, in association with the request, configure the address space of the end-point device, and in response to the request, issue a completion notice to a requesting host upon completion of a requested address space configuration.

In Example 2, the subject matter of Examples 1-9 (excluding the present Example) can optionally include wherein the request is a multi-protocol layer (MPL) stack request message generated by a Vendor Defined Message (VDM) generator of the host, and wherein the memory resource allocation logic includes a VDM receiver configured to receive and decode the MPL stack request message including the at least one address space resize parameter, and further includes a VDM generator configured to generate the completion notice as a multi-protocol layer (MPL) stack completion message for receipt by a VDM receiver of the host.

In Example 3, the subject matter of Examples 1-9 (excluding the present Example) can optionally include wherein the request includes a multi-protocol layer (MPL) stack write request issued by the host to the end-point device, wherein the end-point device has a Vendor-Specific Extended Capability (VSEC) data structure and wherein the memory resource allocation logic is configured to populate the VSEC data structure with the at least one address space resize parameter in response to the MPL stack write request, wherein the completion notice includes a completion field of the VSEC data structure, and wherein the memory resource allocation logic is configured to populate the completion field upon completion of a requested address space configuration, for reading by the host with an MPL stack read request.

In Example 4, the subject matter of Examples 1-9 (excluding the present Example) can optionally include wherein the request requests the end-point device to configure the at least one base address register to resize an address space of the end-point device, and includes at least one address space resize parameter including a changed size value defining a changed size of a requested address space resizing.

In Example 5, the subject matter of Examples 1-9 (excluding the present Example) can optionally include wherein a single request requests the end-point device to configure a plurality of base address registers to resize a plurality of address spaces of the end-point device, and includes a plurality of address space resize parameters including for each of the plurality of base address registers, a changed size value defining a changed size of a requested address space resizing for an associated base address register.

In Example 6, the subject matter of Examples 1-9 (excluding the present Example) can optionally include wherein the memory resource allocation logic includes a resizing enable register and the memory resource allocation logic is configured to populate the address space resizing enable register to enable address space resizing as a function of the request.

In Example 7, the subject matter of Examples 1-9 (excluding the present Example) can optionally include wherein the request includes at least one address space resize parameter which has been encrypted, and wherein the memory resource allocation logic is further configured to decrypt an encrypted address space resize parameter of a received request.

In Example 8, the subject matter of Examples 1-9 (excluding the present Example) can optionally include wherein a single request requests the end-point device to configure a plurality of base address registers to resize a plurality of address spaces of the end-point device, and includes at least one address space resize parameter which includes a data structure containing a plurality of address space resize parameters including for each of a plurality of base address registers, a changed size value defining a changed size of a requested address space resizing for an associated base address register.

In Example 9, the subject matter of Examples 1-9 (excluding the present Example) can optionally include a system, said system comprising: said processor logic and said memory, and at least one of a display communicatively coupled to the processor logic, a network interface communicatively coupled to the processor logic, and a battery coupled to provide power to the system.

Example 10 is a method, comprising: an end-point device receiving a request from a host requesting configuration of an address space of the end-point device wherein the request includes at least one address space resize parameter defining a changed size of a requested address space resizing, in association with the request, configuring the address space of the end-point device, and the end-point device in response to the request, issuing a completion notice to a requesting host upon completion of a requested address space configuration.

In Example 11, the subject matter of Examples 10-17 (excluding the present Example) can optionally include wherein the request is a multi-protocol layer (MPL) stack request message generated by a Vendor Defined Message (VDM) generator of the host, the MPL stack request message including the at least one address space resize parameter is received and decoded by a VDM receiver of the end-point device, the completion notice is a multi-protocol layer (MPL) stack completion message generated by a VDM generator of the end-point device, and the MPL stack completion message is received by a VDM receiver of the host.

In Example 12, the subject matter of Examples 10-17 (excluding the present Example) can optionally include wherein the request includes a multi-protocol layer (MPL) stack write request issued by the host to the end-point device which upon execution, causes population of a Vendor-Specific Extended Capability (VSEC) data structure in the end-point device with the at least one address space resize parameter, and the completion notice includes a completion field of the VSEC data structure, populated by the end-point device upon completion of a requested address space configuration and read by the host with an MPL stack read request.

In Example 13, the subject matter of Examples 10-17 (excluding the present Example) can optionally include wherein the request requests the end-point device to configure a base address register to resize an address space of the end-point device, and includes at least one address space resize parameter including a changed size value defining a changed size of a requested address space resizing.

In Example 14, the subject matter of Examples 10-17 (excluding the present Example) can optionally include wherein a single request requests the end-point device to configure a plurality of base address registers to resize a plurality of address spaces of the end-point device, and includes a plurality of address space resize parameters including for each of the plurality of base address registers, a changed size value defining a changed size of a requested address space resizing for an associated base address register.

In Example 15, the subject matter of Examples 10-17 (excluding the present Example) can optionally include wherein the request is configured to populate an address space resizing enable register of the end-point device to enable address space resizing as a function of the request.

In Example 16, the subject matter of Examples 10-17 (excluding the present Example) can optionally include wherein the request includes at least one address space resize parameter which has been encrypted, the method further comprising the end-point device decrypting an encrypted address space resize parameter of a received request.

In Example 17, the subject matter of Examples 10-17 (excluding the present Example) can optionally include wherein a single request requests the end-point device to configure a plurality of base address registers to resize a plurality of address spaces of the end-point device, and includes at least one address space resize parameter which includes a data structure containing a plurality of address space resize parameters including for each of a plurality of base address registers, a changed size value defining a changed size of a requested address space resizing for an associated base address register.

Example 18 is an apparatus comprising means to perform a method as claimed in any preceding example.

Example 19 is a system, comprising: host including a central processing unit, and an end-point device coupled to the host and having at least one base address register, wherein the host has memory resource allocation logic configured to: generate and send to the end-point device, a request requesting configuration of an address space of the end-point device wherein the request includes at least one address space resize parameter defining a changed size of a requested address space resizing and wherein the end-point device has memory resource allocation logic configured to: receive a request from a host requesting configuration of an address space of the end-point device wherein the request includes at least one address space resize parameter defining a changed size of a requested address space resizing, in association with the request, configure the address space of the end-point device, and in response to the request, issue a completion notice to a requesting host upon completion of a requested address space configuration.

In Example 20, the subject matter of Examples 19-27 (excluding the present Example) can optionally include wherein the memory resource allocation logic of the host has a Vendor Defined Message (VDM) receiver and a VDM generator configured to generate the request as a multi-protocol layer (MPL) stack request message, and wherein the memory resource allocation logic of the end-point device includes a VDM receiver configured to receive and decode the MPL stack request message including the at least one address space resize parameter, and further includes a VDM generator configured to generate the completion notice as a multi-protocol layer (MPL) stack completion message for receipt by the VDM receiver of the host.

In Example 21, the subject matter of Examples 19-27 (excluding the present Example) can optionally include wherein the memory resource allocation logic of the host is configured to generate an MPL stack read request and generate and issue to the end-point device, the request as a multi-protocol layer (MPL) stack write request, wherein the end-point device has a Vendor-Specific Extended Capability (VSEC) data structure and wherein the memory resource allocation logic of the end-point device is configured to populate the VSEC data structure with the at least one address space resize parameter in response to the MPL stack write request, wherein the completion notice includes a completion field of the VSEC data structure, and wherein the memory resource allocation logic of the end-point device is configured to populate the completion field upon completion of a requested address space configuration, for reading by the host with an MPL stack read request.

In Example 22, the subject matter of Examples 19-27 (excluding the present Example) can optionally include wherein the request requests the end-point device to configure the at least one base address register to resize an address space of the end-point device, and includes at least one address space resize parameter including a changed size value defining a changed size of a requested address space resizing.

In Example 23, the subject matter of Examples 19-27 (excluding the present Example) can optionally include wherein a single request requests the end-point device to configure a plurality of base address registers to resize a plurality of address spaces of the end-point device, and includes a plurality of address space resize parameters including for each of the plurality of base address registers, a changed size value defining a changed size of a requested address space resizing for an associated base address register.

In Example 24, the subject matter of Examples 19-27 (excluding the present Example) can optionally include wherein the memory resource allocation logic of the end-point device includes a resizing enable register and the memory resource allocation logic of the end-point device is configured to populate the address space resizing enable register to enable address space resizing as a function of the request.

In Example 25, the subject matter of Examples 19-27 (excluding the present Example) can optionally include wherein the memory resource allocation logic of the host is configured to encrypt at least one address space resize parameter of the request, and wherein the memory resource allocation logic of the end-point device is further configured to decrypt an encrypted address space resize parameter of a received request.

In Example 26, the subject matter of Examples 19-27 (excluding the present Example) can optionally include wherein a single request requests the end-point device to configure a plurality of base address registers to resize a plurality of address spaces of the end-point device, and includes at least one address space resize parameter which includes a data structure containing a plurality of address space resize parameters including for each of a plurality of base address registers, a changed size value defining a changed size of a requested address space resizing for an associated base address register.

In Example 27, the subject matter of Examples 19-27 (excluding the present Example) can optionally include at least one of: a display communicatively coupled to the central processing unit, a network interface communicatively coupled to the central processing unit, and a battery coupled to provide power to the system.

Example 28 is an apparatus for use with a host, comprising: an end-point device having at least one base address register, and memory resource allocation logic means configured for receiving a request from a host requesting configuration of an address space of the end-point device wherein the request includes at least one address space resize parameter defining a changed size of a requested address space resizing, in association with the request, configuring the address space of the end-point device, and in response to the request, issuing a completion notice to a requesting host upon completion of a requested address space configuration.

Example 29 is a computer program product for a computing system having a host and an end-point device, wherein the computer program product comprises a computer readable storage medium having program instructions embodied therewith, the program instructions executable by a processor of the computing system to cause operations, the operations comprising: an end-point device receiving a request from a host requesting configuration of an address space of the end-point device wherein the request includes at least one address space resize parameter defining a changed size of a requested address space resizing, in association with the request, configuring the address space of the end-point device, and the end-point device in response to the request, issuing a completion notice to a requesting host upon completion of a requested address space configuration.

All optional features of any of the systems and/or apparatus described above may also be implemented with respect to the method or process described above, and specifics in the examples may be used anywhere in one or more embodiments. Additionally, all optional features of the method or process described above may also be implemented with respect to any of the system and/or apparatus described above, and specifics in the examples may be used anywhere in one or more embodiments.

What is claimed is:

1. An apparatus for use with a host having a host address space, comprising:
    an end-point device having at least one base address register, and memory resource allocation logic configured to:
        receive a request from a host requesting address space mapping configuration of an address space of the end-point device wherein the request includes at least one address space resize parameter defining a changed size of a requested address space mapping resizing;
        in association with the request, configure mapping of the address space of the end-point device to the host address space; and
        in response to the request, issue a completion notice to a requesting host upon completion of a requested address space mapping configuration;
        wherein the request includes a multi-protocol layer (MPL) stack write request issued by the host to the end-point device, wherein the end-point device has a Vendor-Specific Extended Capability (VSEC) data structure and wherein the memory resource allocation logic is configured to populate the VSEC data structure with the at least one address space resize parameter in response to the MPL stack write request, wherein the completion notice includes a completion field of the VSEC data structure, and wherein the memory resource allocation logic is configured to populate the completion field upon completion of a requested address space configuration, for reading by the host with an MPL stack read request.

2. The apparatus of claim 1 wherein the request is a multi-protocol layer (MPL) stack request message generated by a Vendor Defined Message (VDM) generator of the host, and wherein the memory resource allocation logic includes a VDM receiver configured to receive and decode the MPL stack request message including the at least one address space resize parameter, and further includes a VDM generator configured to generate the completion notice as a multi-protocol layer (MPL) stack completion message for receipt by a VDM receiver of the host.

3. The apparatus of claim 1 wherein the request requests the end-point device to configure the at least one base address register to resize mapping an address space of the end-point device, and includes at least one address space resize parameter including a changed size value defining a changed size of a requested address space mapping resizing.

4. The apparatus of claim 1 wherein a single request requests the end-point device to configure a plurality of base address registers to resize mapping of a plurality of address spaces of the end-point device, and includes a plurality of address space resize parameters including for each of the plurality of base address registers, a changed size value defining a changed size of a requested address space mapping resizing for an associated base address register.

5. The apparatus of claim 1 wherein the memory resource allocation logic includes a resizing enable register and the memory resource allocation logic is configured to populate the address space resizing enable register to enable address space mapping resizing as a function of the request.

6. The apparatus of claim 1 wherein the request includes at least one address space resize parameter which has been encrypted, and wherein the memory resource allocation logic is further configured to decrypt an encrypted address space resize parameter of a received request.

7. The apparatus of claim 1 wherein a single request requests the end-point device to configure a plurality of base address registers to resize mapping of a plurality of address spaces of the end-point device, and includes at least one address space resize parameter which includes a data structure containing a plurality of address space resize parameters including for each of a plurality of base address registers, a changed size value defining a changed size of a requested address space mapping resizing for an associated base address register.

8. A method, comprising:
    an end-point device receiving a request from a host requesting address space mapping configuration of an address space of the end-point device wherein the request includes at least one address space resize parameter defining a changed size of a requested address space mapping resizing;
    in association with the request, configuring mapping of the address space of the end-point device to a host address space; and
    the end-point device in response to the request, issuing a completion notice to a requesting host upon completion of a requested address space mapping configuration;
    wherein the request includes a multi-protocol layer (MPL) stack write request issued by the host to the end-point device which upon execution, causes population of a Vendor-Specific Extended Capability (VSEC) data structure in the end-point device with the at least one address space resize parameter, and the completion notice includes a completion field of the VSEC data structure, populated by the end-point device upon completion of a requested address space configuration and read by the host with an MPL stack read request.

9. The method of claim 8 wherein the request is a multi-protocol layer (MPL) stack request message generated by a Vendor Defined Message (VDM) generator of the host, the MPL stack request message including the at least one address space resize parameter is received and decoded by a VDM receiver of the end-point device, the completion notice is a multi-protocol layer (MPL) stack completion message generated by a VDM generator of the end-point device, and the MPL stack completion message is received by a VDM receiver of the host.

10. The method of claim 8 wherein the request requests the end-point device to configure a base address register to resize mapping an address space of the end-point device, and includes at least one address space resize parameter including a changed size value defining a changed size of a requested address space mapping resizing.

11. The method of claim 8 wherein a single request requests the end-point device to configure a plurality of base address registers to resize mapping of a plurality of address spaces of the end-point device, and includes a plurality of address space resize parameters including for each of the plurality of base address registers, a changed size value defining a changed size of a requested address space mapping resizing for an associated base address register.

12. The method of claim 8 wherein the request is configured to populate an address space resizing enable register of the end-point device to enable address space mapping resizing as a function of the request.

13. The method of claim 8 wherein the request includes at least one address space resize parameter which has been encrypted, the method further comprising the end-point device decrypting an encrypted address space resize parameter of a received request.

14. The method of claim 8 wherein a single request requests the end-point device to configure a plurality of base address registers to resize mapping of a plurality of address spaces of the end-point device, and includes at least one address space resize parameter which includes a data structure containing a plurality of address space resize parameters including for each of a plurality of base address registers, a changed size value defining a changed size of a requested address space mapping resizing for an associated base address register.

15. A system, comprising:
host including a central processing unit and having a host address space; and
an end-point device coupled to the host and having at least one base address register, wherein the host has memory resource allocation logic configured to generate and send to the end-point device, a request requesting address space mapping configuration of an address space of the end-point device wherein the request includes at least one address space resize parameter defining a changed size of a requested address space mapping resizing to a host address space and wherein the end-point device has memory resource allocation logic configured to:
receive a request from a host requesting configuration of an address space of the end-point device wherein the request includes at least one address space resize parameter defining a changed size of a requested address space resizing;
in association with the request, configure the mapping of address space of the end-point device to the host address space; and
in response to the request, issue a completion notice to a requesting host upon completion of a requested address space mapping configuration;
wherein the memory resource allocation logic of the host is configured to generate an MPL stack read request and generate and issue to the end-point device, the request as a multi-protocol layer (MPL) stack write request, wherein the end-point device has a Vendor-Specific Extended Capability (VSEC) data structure and wherein the memory resource allocation logic of the end-point device is configured to populate the VSEC data structure with the at least one address space resize parameter in response to the MPL stack write request, wherein the completion notice includes a completion field of the VSEC data structure, and wherein the memory resource allocation logic of the end-point device is configured to populate the completion field upon completion of a requested address space configuration, for reading by the host with an MPL stack read request.

16. The system of claim 15 wherein the memory resource allocation logic of the host has a Vendor Defined Message (VDM) receiver and a VDM generator configured to generate the request as a multi-protocol layer (MPL) stack request message, and wherein the memory resource allocation logic of the end-point device includes a VDM receiver configured to receive and decode the MPL stack request message including the at least one address space resize parameter, and further includes a VDM generator configured to generate the completion notice as a multi-protocol layer (MPL) stack completion message for receipt by the VDM receiver of the host.

17. The system of claim 15 wherein the request requests the end-point device to configure the at least one base address register to resize mapping an address space of the end-point device, and includes at least one address space resize parameter including a changed size value defining a changed size of a requested address space mapping resizing.

18. The system of claim 15 wherein a single request requests the end-point device to configure a plurality of base address registers to resize mapping of a plurality of address spaces of the end-point device, and includes a plurality of address space resize parameters including for each of the plurality of base address registers, a changed size value defining a changed size of a requested address space mapping resizing for an associated base address register.

19. The system of claim 15 wherein the memory resource allocation logic of the end-point device includes a resizing enable register and the memory resource allocation logic of the end-point device is configured to populate the address space resizing enable register to enable address space mapping resizing as a function of the request.

20. The system of claim 15 wherein the memory resource allocation logic of the host is configured to encrypt at least one address space resize parameter of the request, and wherein the memory resource allocation logic of the end-point device is further configured to decrypt an encrypted address space resize parameter of a received request.

21. The system of claim 15 wherein a single request requests the end-point device to configure a plurality of base address registers to resize mapping a plurality of address spaces of the end-point device, and includes at least one address space resize parameter which includes a data structure containing a plurality of address space resize parameters including for each of a plurality of base address registers, a changed size value defining a changed size of a requested address space mapping resizing for an associated base address register.

* * * * *